United States Patent
Islam

(10) Patent No.: US 10,779,259 B2
(45) Date of Patent: Sep. 15, 2020

(54) QUASI CO-LOCATION OF ANTENNA PORTS USED TO TRANSMIT PAGING MESSAGE AND SYNCHRONIZATION SIGNALS

(71) Applicant: QUALCOMM Incorporated, San Diego, CA (US)

(72) Inventor: Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/915,591

(22) Filed: Mar. 8, 2018

(65) Prior Publication Data

US 2018/0288737 A1 Oct. 4, 2018

Related U.S. Application Data

(60) Provisional application No. 62/521,315, filed on Jun. 16, 2017, provisional application No. 62/502,241, (Continued)

(51) Int. Cl.
*H04W 68/02* (2009.01)
*H04L 5/00* (2006.01)
(Continued)

(52) U.S. Cl.
CPC .......... *H04W 68/02* (2013.01); *H04J 3/1694* (2013.01); *H04L 5/0023* (2013.01);
(Continued)

(58) Field of Classification Search
CPC ... H04L 5/0053; H04L 5/0007; H04L 5/0048; H04L 5/0051; H04L 5/0055;
(Continued)

(56) References Cited

U.S. PATENT DOCUMENTS 9,775,124 B2  9/2017  Yi et al.
9,788,310 B2  10/2017  Chen et al.
(Continued)

FOREIGN PATENT DOCUMENTS

EP  2654333 A1  10/2013
EP  2892169 A2  7/2015

OTHER PUBLICATIONS

Samsung: "Remaining Issues on Quasi Co-Location of Antenna Ports", 3GPP TSG-RAN WG1#70, 3GPP, Aug. 17, 2012, R1-123855, URL: http://www.3gpp.org/ftp/tsg_ran/WG1_RL1/TSGR1_70/Docs/R1-123855.zip pp. 1-7.

(Continued)

*Primary Examiner* — Natasha W Cosme
(74) *Attorney, Agent, or Firm* — Liem T. Do

(57) ABSTRACT

Methods, systems, and devices for wireless communication are described. A base station may use quasi co-located antenna ports for transmission of synchronization signal(s)/reference signal(s) and paging signals. For example, the base station may use a first antenna port configuration for transmission of the synchronization/reference signal(s) and a second antenna port configuration for transmission of the paging signal (e.g., paging indicator, paging message, etc.). The base station may transmit an indication of the quasi co-located antenna ports. A user equipment (UE) may receive the synchronization signal and, based on the antenna ports being quasi co-located, receive the paging signal. In some examples, the UE may determine which receive beam to use to receive the paging signal based on the antenna ports being quasi co-located. In some aspects, the UE may use a reference signal transmitted on antenna ports that are quasi co-located with the paging signal antenna ports.

30 Claims, 17 Drawing Sheets

Related U.S. Application Data filed on May 5, 2017, provisional application No. 62/481,069, filed on Apr. 3, 2017.

(51) Int. Cl.
*H04W 72/04* (2009.01)
*H04W 52/02* (2009.01)
*H04W 56/00* (2009.01)
*H04J 3/16* (2006.01)
*H04W 48/12* (2009.01)
*H04B 7/0413* (2017.01)
*H04B 7/06* (2006.01)

(52) U.S. Cl.
CPC .......... *H04L 5/0051* (2013.01); *H04L 5/0053* (2013.01); *H04W 52/0216* (2013.01); *H04W 56/001* (2013.01); *H04W 72/042* (2013.01); *H04W 72/0446* (2013.01); *H04B 7/0413* (2013.01); *H04B 7/0617* (2013.01); *H04L 5/0091* (2013.01); *H04W 48/12* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/20* (2018.01); *Y02D 70/21* (2018.01); *Y02D 70/22* (2018.01); *Y02D 70/24* (2018.01)

(58) Field of Classification Search
CPC ... H04L 1/1812; H04L 1/1819; H04L 1/1854; H04L 1/1896; H04L 5/0016; H04L 5/0023; H04L 5/0026; H04L 5/0044; H04L 5/0091; H04L 5/0092; H04L 5/0094; H04W 72/0413; H04W 72/0446; H04W 56/001; H04W 72/042; H04W 52/246; H04W 56/0045; H04W 76/27; H04W 56/003; H04W 72/0453; H04W 72/046; H04W 72/12; H04W 72/1215; H04W 72/1268; H04W 72/1284; H04W 74/0808; H04W 74/0833

See application file for complete search history.

(56) References Cited

U.S. PATENT DOCUMENTS

| | | |
|---|---|---|
| 9,801,119 B2 | 10/2017 | Koorapaty et al. |
| 9,807,718 B2 | 10/2017 | Axmon et al. |
| 2017/0303220 A1 | 10/2017 | Sadeghi et al. |
| 2018/0227899 A1* | 8/2018 | Yu .......................... H04B 7/02 |

OTHER PUBLICATIONS

International Search Report and Written Opinion—PCT/US2018/021825—ISA/EPO—dated Jun. 6, 2018.

* cited by examiner

QUASI CO-LOCATION OF ANTENNA PORTS USED TO TRANSMIT PAGING MESSAGE AND SYNCHRONIZATION SIGNALS

CROSS REFERENCES

The present Application for Patent claims priority to U.S. Provisional Patent Application No. 62/481,069 by Islam, entitled "Quasi Co-Location of Antenna Ports Used To Transmit Paging Message and Synchronization Signals," filed Apr. 3, 2017, and to U.S. Provisional Patent Application No. 62/502,241 by Islam, entitled" Quasi Co-Location of Antenna Ports Used To Transmit Paging Message and Synchronization Signals, filed May 5, 2017 and to U.S. Provisional Patent Application No. 62/521,315 by Islam, entitled "Quasi Co-Location of Antenna Ports Used To Transmit Paging Message and Synchronization Signals, filed Jun. 16, 2017 and assigned to the assignee hereof.

BACKGROUND

The following relates generally to wireless communication, and more specifically to quasi co-location of antenna ports used to transmit paging message and synchronization signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems, devices (e.g., base stations and UEs) may communicate using directional transmissions (e.g., beams), in which beamforming may be applied using multiple antenna elements to steer a beam in a particular direction. In some cases, a base station may be unaware of a particular location of a UE, such as when a gap in communications occurs while a UE is moving. When a first device does not know the direction in which to transmit to a second device, the first device may transmit to the second device by sweeping through a set of beams focused in different directions, and transmitting a duplicative signal or information on each of the beams. Additionally or alternatively, the second device may sweep through a set of beams in an attempt to locate the beam or beams on which the first device is transmitting. However, sweeping through a set of beams is costly in terms of time, power consumption, and air resources.

One example of such costly beam sweeping operations includes paging operations. UEs may typically enter a discontinuous reception (DRX) mode to conserve power by powering down or off certain communication chains of the UE. The DRX cycle may include the UEs waking up after a DRX period to listen for paging messages. In a wireless system that uses beamforming techniques, the UE may have moved while in the DRX mode and this may require to the UE to determine (or re-determine) which receive beam the UE will use to listen for paging signals. This again may result in the UE having to sweep through multiple beams to identify the best receive beam, which may be costly in terms of time, power consumption, air resources, and the like.

SUMMARY

The described techniques relate to improved methods, systems, devices, or apparatuses that support quasi co-location of antenna ports used to transmit paging message and synchronization signals. Generally, the described techniques provide for making the antenna ports used to transmit synchronization/reference signals quasi co-located (QCL) with the antenna ports used to transmit paging signals. Moreover, a user equipment (UE) may wake up from a discontinuous reception (DRX) mode early to listen for synchronization/reference signals. The UE may find its best receive beam for the synchronization/reference signals and use this to receive the paging signals. That may provide for the base station to transmit the paging signals in a minimal number of beam sweeps. Thus, in some aspects, the base station may transmit a synchronization and/or reference signal to UEs, The synchronization and/or reference signal may be transmitted using a first antenna port configuration. The base station may then transmit the paging signal (e.g., paging message and/or paging indicator) to the UE. The paging signal may be transmitted using a second antenna port configuration. The antenna port configurations may be configured such that the antenna ports used to transmit the synchronization/reference signal are QCL with the antenna ports used to transmit the paging signal, e.g., a demodulation reference signal (DMRS) of the paging signal.

A method of wireless communication is described. The method may include transmitting a reference signal to a UE and transmitting a paging signal to the UE, wherein the reference signal and a DMRS of the paging signal are quasi co-located.

An apparatus for wireless communication is described. The apparatus may include means for transmitting a reference signal to a UE and means for transmitting a paging signal to the UE, wherein the reference signal and a DMRS of the paging signal are quasi co-located.

Another apparatus for wireless communication is described. The apparatus may include a processor, memory in electronic communication with the processor, and instructions stored in the memory. The instructions may be operable to cause the processor to transmit a reference signal to a UE and transmit a paging signal to the UE, wherein the reference signal and a DMRS of the paging signal are quasi co-located.

A non-transitory computer-readable medium for wireless communication is described. The non-transitory computer-readable medium may include instructions operable to cause a processor to transmit a reference signal to a UE and transmit a paging signal to the UE, wherein the reference signal and a DMRS of the paging signal are quasi co-located.

In some examples of the method, apparatus, and non-transitory computer-readable medium described above, the paging signal comprises at least one of a paging message, or a paging schedule, or a paging indication. In some examples of the method, apparatus, and non-transitory computer-readable medium described above, the paging message may be communicated in a physical downlink shared channel (PDSCH) and the paging schedule may be communicated in a physical downlink control channel (PDCCH).

In some examples of the method, apparatus, and non-transitory computer-readable medium described above, the paging indication comprises a paging downlink control indicator (DCI).

Some examples of the method, apparatus, and non-transitory computer-readable medium described above may further include processes, features, means, or instructions for time-divisioning multiplexing (TDM) the reference signal and the paging signal.

In some examples of the method, apparatus, and non-transitory computer-readable medium described above, TDM the reference signal and the paging signal comprises: transmitting the reference signal in the same slot as the paging signal.

In some examples of the method, apparatus, and non-transitory computer-readable medium described above, TDM the reference signal and the paging signal comprises: transmitting the reference signal in a different slot than the paging signal.

In some examples of the method, apparatus, and non-transitory computer-readable medium described above, the reference signal may be transmitted using a first antenna port configuration and the paging signal may be transmitted using a second antenna port configuration, and wherein first antenna port configuration used to transmit the reference signal comprises antenna ports that may be quasi co-located with respect to antenna ports of the second antenna port configuration used to transmit the paging signal.

Some examples of the method, apparatus, and non-transitory computer-readable medium described above may further include processes, features, means, or instructions for transmitting an indication of the quasi co-located antenna ports of the first antenna port configuration and the second antenna port configuration.

In some examples of the method, apparatus, and non-transitory computer-readable medium described above, the indication may be transmitted in one or more of a master information block (MIB), a minimum system information block (MSIB), a physical downlink control channel (PDCCH), a physical downlink shared channel (PDSCH), and a radio resource control (RRC) message exchange.

In some examples of the method, apparatus, and non-transitory computer-readable medium described above, the indication may be transmitted using a different carrier than the reference signal and the paging signal.

In some examples of the method, apparatus, and non-transitory computer-readable medium described above, the reference signal comprises one or more of a primary synchronization signal (PSS), a secondary synchronization signal (SSS), a physical broadcast channel (PBCH), a tertiary synchronization signal (TSS), a mobility reference signal, a beam reference signal (BRS), a tracking reference signal (TRS), a channel state information reference signal (CSI-RS), or a combination thereof.

Some examples of the method, apparatus, and non-transitory computer-readable medium described above may further include processes, features, means, or instructions for transmitting the reference signal in a first beamformed transmission. Some examples of the method, apparatus, and non-transitory computer-readable medium described above may further include processes, features, means, or instructions for transmitting the paging signal in a second beamformed transmission.

Some examples of the method, apparatus, and non-transitory computer-readable medium described above may further include processes, features, means, or instructions for inferring a set of properties for a channel that the reference signal may be transmitted over using a first antenna port configuration based at least in part on one or more properties associated with a channel that the paging signal may be transmitted over using a second antenna port configuration.

Some examples of the method, apparatus, and non-transitory computer-readable medium described above may further include processes, features, means, or instructions for determining, based at least in part on the inference, that the antenna ports of the first antenna port configuration may be quasi co-located with respect to the antenna ports of the second antenna port configuration.

In some examples of the method, apparatus, and non-transitory computer-readable medium described above, the set of properties comprise one or more of a delay spread, a Doppler spread, a Doppler shift, an average gain, an average delay, an angle of arrival, and an angle of departure. In some examples of the method, apparatus, and non-transitory computer-readable medium described above, the reference signal and the DMRS of the paging signal are quasi co-located with respect to receive beamforming.

A method of wireless communication is described. The method may include receiving a reference signal transmitted from a base station and receiving a paging signal from the base station, wherein the reference signal and a DMRS of the paging signal are quasi co-located.

An apparatus for wireless communication is described. The apparatus may include means for receiving a reference signal transmitted from a base station and means for receiving a paging signal from the base station, wherein the reference signal and a DMRS of the paging signal are quasi co-located.

Another apparatus for wireless communication is described. The apparatus may include a processor, memory in electronic communication with the processor, and instructions stored in the memory. The instructions may be operable to cause the processor to receive a reference signal transmitted from a base station and receive a paging signal from the base station, wherein the reference signal and a DMRS of the paging signal are quasi co-located.

A non-transitory computer-readable medium for wireless communication is described. The non-transitory computer-readable medium may include instructions operable to cause a processor to receive a reference signal transmitted from a base station and receive a paging signal from the base station, wherein the reference signal and a DMRS of the paging signal are quasi co-located.

Some examples of the method, apparatus, and non-transitory computer-readable medium described above may further include processes, features, means, or instructions for receiving the paging signal using a first receive antenna port configuration, the paging signal received using a second receive antenna port configuration.

In some examples of the method, apparatus, and non-transitory computer-readable medium described above, the paging signal comprises at least one of a paging message, or a paging schedule, or a paging indication. In some examples of the method, apparatus, and non-transitory computer-readable medium described above, the paging message may be communicated in a physical downlink shared channel (PDSCH) and the paging schedule may be communicated in a physical downlink control channel (PDCCH).

In some examples of the method, apparatus, and non-transitory computer-readable medium described above, the paging indication comprises a paging DCI.

Some examples of the method, apparatus, and non-transitory computer-readable medium described above may further include processes, features, means, or instructions for receiving an indication of a first antenna port configuration used to transmit the reference signal and a second antenna port configuration used to transmit the paging signal, wherein the first antenna port configuration comprises antenna ports that may be quasi co-located with respect to antenna ports of the second antenna port configuration. Some examples of the method, apparatus, and non-transitory computer-readable medium described above may further include processes, features, means, or instructions for determining, based at least in part on the indication, a receive antenna port configuration used to receive the paging signal.

In some examples of the method, apparatus, and non-transitory computer-readable medium described above, the indication may be received in one or more of a MIB, a MSIB, a PDCCH, a PDSCH, and a RRC message exchange.

In some examples of the method, apparatus, and non-transitory computer-readable medium described above, the reference signal comprises one or more of a PSS, a SSS, a PBCH, a TSS, a mobility reference signal, a BRS, a TRS, a CSI-RS, or a combination thereof.

DETAILED DESCRIPTION

Figure 1:
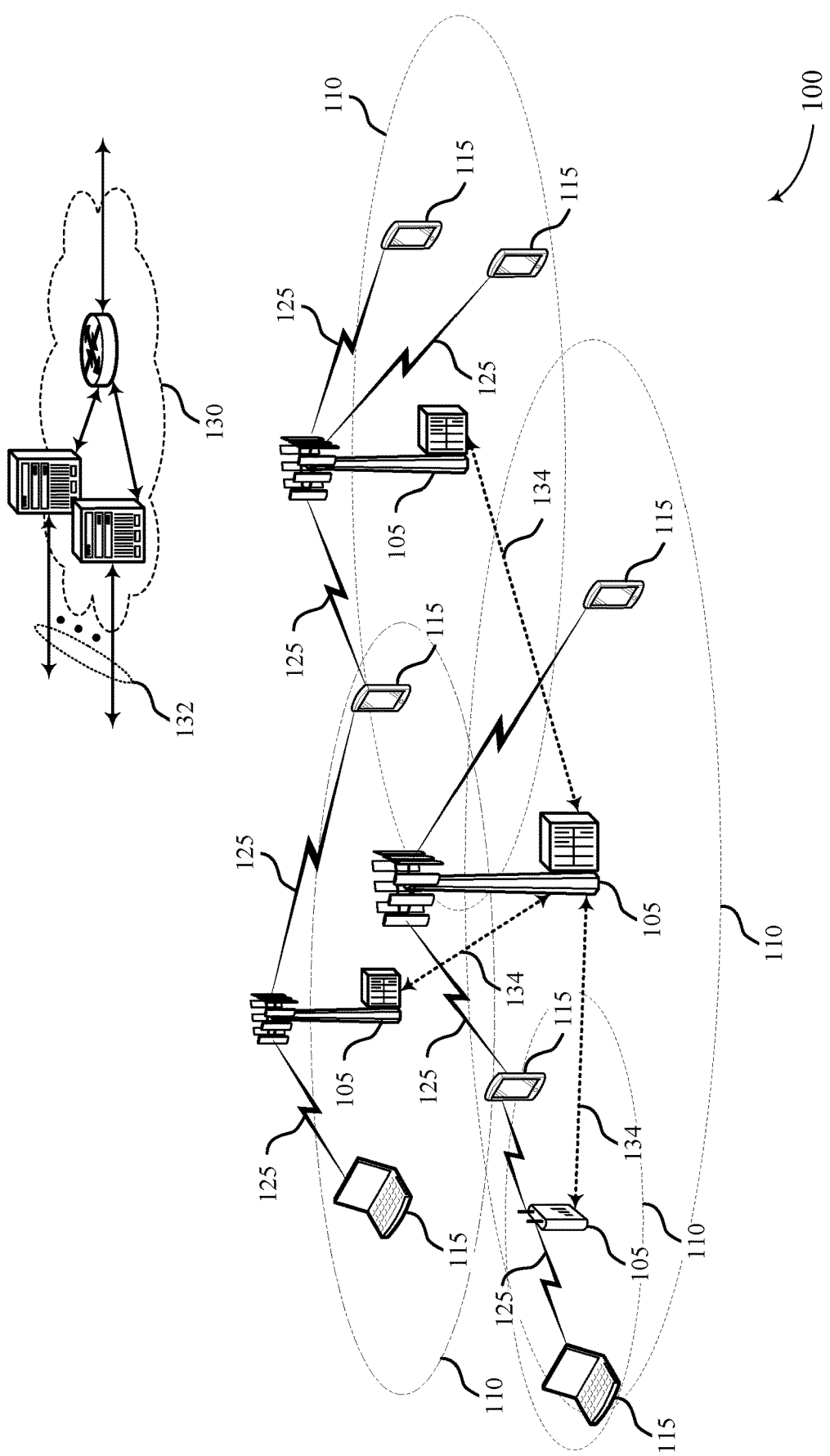
FIG. 1 illustrates an example of a system for wireless communication that supports quasi co-location of antenna ports used to transmit paging message and synchronization signals in accordance with aspects of the present disclosure.

In some wireless communication systems, such as millimeter wave (mmW) systems or a new radio (NR) systems, a base station and a user equipment (UE) may utilize directional transmissions during a paging procedure. In some cases, a base station may transmit a paging signal (e.g., a paging indicator and/or paging message) to one or more UEs by sweeping through a set of directional beams. Transmitting the paging signal by sweeping through a set of beams enables transmission of the paging information to idle-state or radio resource control (RRC)-inactive UEs for which the best beam(s) on which to transmit to the one or more UEs may not be known by the base station. Moreover, the UE may have different antenna port configurations which receive beams in a directional manner. When the UE wakes up from the inactive state to look for paging signals, the UE may not know which direction the base station is located (e.g., the UE may have changed locations while in the inactive state) and therefore may not know which receive beam to use for receiving transmissions from the base station. As one example where the base station has 64 different beam directions and the UE has four different receive beams, this may lead to as many as 256 different transmissions of the paging signals before suitable transmit and receive beams are identified.

Aspects of the disclosure are initially described in the context of a wireless communications system. A wireless communication system, such as a mmW wireless system, may be configured to use quasi co-located (QCL) antenna ports for transmission of synchronization signals and paging signals by the base station. Additionally or alternatively, the base station may use QCL antenna ports for transmission of reference signals and paging signals. Additionally or alternatively, the base station may use the same antenna ports for transmission of synchronization and paging signals. The base station may transmit an indication of the QCL antenna ports (or information indicating that the antenna ports are QCL and/or the same) to the UE such that once the UE receives the synchronization/reference signal, the UE may know which antenna port to use for receiving the paging signal and also which antenna port configuration to use as a receive beam. Thus, the base station may transmit a synchronization signal to the UE, e.g., using a first antenna port configuration, and a paging signal, e.g., using a second antenna port configuration. In some aspects, the base station may transmit a sweeping signal to the UE, e.g., a beam-formed or directional transmission, which may include synchronization and/or reference signals. The antenna port configurations may include the antenna ports used to transmit the synchronization/reference signal QCL with the antenna ports used to transmit the paging signal. The UE may receive the QCL indication, receive the synchronization/reference signal, and use this information to select a receive beam (e.g., an antenna port configuration to use for receiving the paging signal at the UE). Thus, the UE may assume QCL between the synchronization/reference signal blocks and the paging downlink control indicators (DCIs) and paging messages.

Aspects of the disclosure are further illustrated by and described with reference to apparatus diagrams, system diagrams, and flowcharts that relate to quasi co-location of antenna ports used to transmit paging message and synchronization signals.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, a mmW, or a NR network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas (or antenna port configurations) to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas (or antenna port configurations). Some portions of wireless communication system 100 may use beamforming. For example, base station 105 may have an antenna array with a number of rows and columns of antenna ports that the base station 105 may use for beamforming in its communication with UE 115. In some aspects, the base station 105 may use different configurations of the antenna ports/antenna array(s) to define particular antenna port configurations. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit. Time resources may be organized according to radio frames of length of 10 ms, which may be identified by a system frame number (SFN) ranging from 0 to 1023, for example. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol may contain 2048 sample periods, in some examples. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some aspects, wireless communication system 100 may be configured to support the described techniques for QCL antenna ports for synchronization/reference signal transmissions and paging signal transmissions. Generally, two or more antenna ports may be considered quasi co-located (or QCL) if the large-scale properties of the channel over which a symbol on one antenna port is conveyed can be inferred from the channel over which a symbol on the other antenna port is conveyed. In some aspects, the large-scale properties may include one or more (alone or in any combination) of a delay spread, a Doppler spread, a Doppler shift, an average gain, an average delay, an angle of departure, and an angle of arrival. A base station 105 may be configured to transmit a synchronization (and/or reference signal) to a UE 115, e.g., using a first antenna port configuration. In some aspects, the base station 105 may transmit a sweeping signal to the UE 115 using the first antenna port configuration, e.g., a beamformed or directional transmission, which may include synchronization and/or reference signals. The base station 105 may transmit a paging signal to the UE 115, e.g., using a second antenna port configuration. The synchronization (and/or reference) signal may be QCL with respect to a DMRS of the paging signal. For example, the first and second antenna port configurations may be selected or otherwise provide for the antenna ports use to transmit the synchronization signal (and/or reference signal) to be QCL with the antenna ports used to transmit the paging signal.

The UE 115 may receive a synchronization signal (and/or reference signal) from the base station 105. The UE 115 may receive the paging signal using the receive antenna port configuration. In the instance where the UE 115 receives a reference signal, the UE 115 may use this to decode or demodulate the paging signal.

Figure 2:
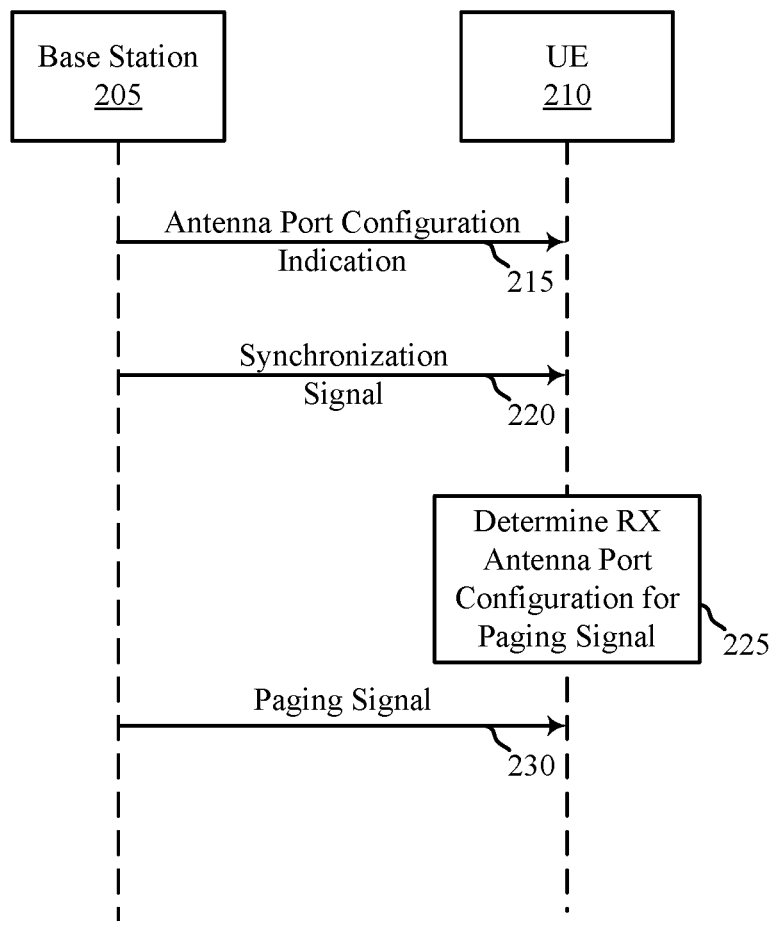
FIG. 2 illustrates an example of a process that supports quasi co-location of antenna ports used to transmit paging message and synchronization signals in accordance with aspects of the present disclosure.

FIG. 2 illustrates an example of a process 200 that supports quasi co-location of antenna ports used to transmit paging message and synchronization signals in accordance with various aspects of the present disclosure. In some examples, process 200 may implement aspects of wireless communication system 100. Process 200 may include a base station 205 and a UE 210, which may be examples of the corresponding devices described herein. Broadly, process 200 illustrates an example where the antenna ports used to transmit a synchronization signal are QCL with antenna ports used to transmit a paging signal.

In some aspects, process 200 illustrates one example where the antenna ports (e.g., antenna port configurations) used to transmit synchronization signal(s) and the antenna ports used to transmit paging signal(s) are QCL and/or the same. Prior to listening for the paging signal(s), UE 210 may wake up early from a DRX mode and listen for the synchronization signal(s). The UE 210 may find or otherwise determine its best receive (RX) beam(s) for the transmitted synchronization signal(s) and use this as its selected RX beam(s) to receive the paging signals.

That is, in some aspects of a multi-beam scenario, the UE 205 may have to sweep its receive beams to receive a signal from base station 210 (e.g., a gNB) if UE 205 does not know its appropriate receive beam by that time. If base station 210 has to transmit paging signals to 64 directions and if UE 205 has to sweep 4 receive beams, then base station 210 should transmit paging signal 256 times in total, e.g., four times towards each of the 64 directions.

However, in accordance with aspects of the present disclosure the antenna ports used to transmit paging and synchronization signals (e.g., sweeping signals) are spatially quasi-co-located and/or the same. Accordingly, UE 205 may wake up slightly before receiving paging signals. The UE 205 may find its appropriate receive beam from the reception of synchronization signals and use a suitable receive beam to receive the paging signal. The QCL relationship between the antenna ports that are used to transmit paging and synchronization signals may be configured for the UE 205. More particularly, UE 205 may wake up before receiving the paging signal and try different receive beams to receive synchronization signals and finds a suitable receive beam to receive synchronization signal (SS) blocks. Base station 210 ensures that the antenna ports used to transmit paging and synchronization signals are spatially QCL with respect to receive beamforming. UE 205 uses the same receive beam to receive paging signal that it used to receive SS blocks.

In some aspects of a multi-beam scenario, UE 210 may have to sweep its RX beams to receive a signal from a gNB (e.g., base station 205) if it does not know its appropriate beam by that time. Base station 205 may use the same antenna ports to transmit the paging and synchronization signals. Thus, UE 210 may wake up slightly before receiving paging signals. UE 210 may find its appropriate RX beam from the reception of synchronization signals and use a suitable RX beam to receive paging signal. The same antenna ports that are used to transmit paging and synchronization signals may be preconfigured for UE 210 and/or base station 205.

At 215, base station 205 may optionally transmit an indication of the QCL antenna ports. For example, base station 205 may transmit an indicator that it is using QCL antenna ports where the antenna ports (e.g., a first antenna port configuration) used to transmit the synchronization signal are QCL with the antenna ports (e.g., a second antenna port configuration) used to transmit the paging signal. Base station 205 may transmit the indication in a master information block (MIB), in a minimum system information block (MSIB), on a physical downlink control channel (PDCCH), in a physical downlink shared channel (PDSCH), in RRC signaling, and the like. Thus, UE 210 may know that QCL (or the same) antenna ports are being used in transmissions from base station 205.

In some aspects, the indication may be carried in different carriers than are used for the synchronization signal and/or paging signal. For example, base station 205 may transmit the indication via an LTE/LTE-A and/or NR network (e.g., sub-6 GHz network) and then the synchronization signals and/or paging signals may be transmitted over a mmW wireless network (e.g., in a beamformed transmission).

In some aspects, there may be no indication of the antenna port configuration. For example, the UE 210 and/or base station 205 may be configured to know that the synchronization and/or paging signals are QCL with respect to aspects of the paging signals. Accordingly, the synchronization and/or reference signals may be QCL with respect to the paging signal without any indication of the antenna port configurations.

At 220, base station 205 may transmit (and UE 210 may receive) a synchronization signal. The synchronization signal may be transmitted using a first antenna port configuration. Examples of the synchronization signal include, but are not limited to, a primary synchronization signal (PSS), a secondary synchronization signal (SSS), a beam reference signal (BRS), a tertiary synchronization signal (TSS), a mobility reference signal, a physical broadcast channel (PBCH) signal, tracking reference signal (TRS), CSI-RS, and the like. The synchronization signal may be transmitted over the PBCH, or similar channel associated with synchronization operations. The synchronization signal may be transmitted in a beamformed transmission (e.g., a first beamformed transmission) from base station 205.

In some aspects, the synchronization signal may contain or otherwise convey information associated with the antenna port configuration used to transmit the synchronization signal. For example, the synchronization signal may contain or otherwise convey a beam index, antenna port(s) identification information, timing information, and the like. Accordingly, a UE (such as UE 210) receiving the synchronization signal may be able to identify or otherwise determine the first antenna port configuration.

In some aspects, the antenna ports used to transmit the synchronization signal may also be QCL with (or the same as) antenna port(s) used to transmit a reference signal that can be used to demodulate the paging signal.

In some aspects, the synchronization signal may also be referred to as a sweeping signal which is transmitted using the first antenna port configuration in a sweeping or directional manner. The sweeping signal may include synchronization signals, reference signals, and the like. In some cases, the sweeping signal may be a signal that is transmitted in a sweeping manner (e.g., beamformed or directional manner) to one or more directions. The sweeping signal may include a synchronization signal and/or a reference signal. In some aspects, the synchronization signal may include a primary synchronization signal (PSS), a secondary synchronization signal (SSS), a tertiary synchronization signal (TSS), and/or extended synchronization signal (ESS). In some aspects, the reference signal may include a CSI-RS, a cell-specific reference signal (CRS), a beam reference signal (BRS), a beam refinement reference signal (BRRS), a mobility reference signal (MRS), and/or a demodulation reference signal (DMRS). In some aspects, the DMRS may be a signal that is used as the reference signal to one or more of a MIB and/or a SIB. The sweeping signal may include a MIB and/or SIB.

At 225, UE 210 may determine its receive antenna port configuration to be used for receiving the paging signal. For example, UE 210 may cycle through one or more receive antenna port configurations (e.g., using one or more antenna ports of the UE 210) to determine which receive antenna port configuration supports the strongest receive signal level for base station 205 transmissions. Accordingly, UE 210 may identify which receive antenna port configuration (e.g., RX beam) to use for listening for future transmissions from base station 205, such as future transmissions of paging signals.

In some aspects, UE 210 may listen for the synchronization signals transmitted from base station 205 and identify which synchronization signal is received with the highest received power level, with the least interference, with the highest supported throughput level and the like. Accordingly, UE 210 may use information carried or otherwise conveyed in the synchronization signal to identify the antenna port configuration (e.g., the first antenna port configuration) used to transmit the synchronization signal. This may provide an indication of which antenna port configuration (e.g., which antenna ports will be used, transmission timing information, etc.) the base station 205 will use for paging signal transmission. That is, since UE 210 knows that base station 205 uses QCL antenna ports (or the same antenna ports) and which antenna port configuration was used to transmit the synchronization signals, the UE 210 can then determine which antenna port configuration will be used by base station 205 to transmit the subsequent paging signal.

In some aspects, since the relationship is fixed (e.g., the synchronization and/or reference signal are QCL with respect to the paging signal), the receive antenna port configuration can be determined using the following technique. First and from the perspective of base station 205, assume that base station 205 transmits 20 synchronization signal blocks (SSB), i.e., transmits synchronization signal towards 20 directions. Base station 205 may also transmit paging signal towards 20 directions. In some aspects, the DMRS of the N-th paging signal (message/schedule/indicator) may be QCL with that of the N-th SSB. Once UE 210 detects a SSB with a certain receive beam, it can use the same or a refined receive beam to receive the paging signal.

At 230, base station 205 may transmit (and UE 210 may receive) a paging signal. The paging signal may be any paging related information, such as a paging indicator (e.g., a paging DCI), a paging message, and the like. The paging signal may be transmitted in a beamformed transmission (e.g., a second beamformed transmission).

In some aspects, the antenna ports used to transmit the paging signal may be QCL with the antenna ports used to transmit the synchronization signal. QCL antenna ports may include two antenna ports where the properties (e.g., large-scale properties) of the channel over which a symbol on one antenna port is conveyed can be inferred from the channel over which a symbol on the other antenna port is conveyed. Examples of the properties may include, but are not limited to one or more of delay spread, Doppler spread, Doppler shift, average gain, an average delay, an angle of arrival, an angle of departure, or any combination thereof. In some aspects, base station 205 may infer the properties, e.g., over a period of time (periodic or dynamically), over a certain number of previous transmissions, etc., and determine the antenna port configurations to use for the synchronization signal and paging signal transmissions. In some aspects, the antenna ports used to transmit the paging signal may be the same antenna ports used to transmit the synchronization signal (or reference signal).

In some aspects, the synchronization signal and the paging signal may be multiplexed. For example, the synchronization signal and the paging signal may be TDM together, e.g., either in the same slot (transmitted side-by-side) or different slots (transmitted in separate slots in a disjoint manner).

In some aspects (not shown), base station 205 may also transmit one or more reference signals using antenna ports that are QCL with (or the same as) the antenna ports used to transmit the synchronization signal and/or paging signal. The UE 210 may use the reference signals to decode the paging signal.

Thus, in some aspects the UE 210 may receive the signaling of the QCL between the synchronization and paging antenna ports, observe the synchronization signal and then determine the RX beam to use to listen to the paging signal.

Figure 3:
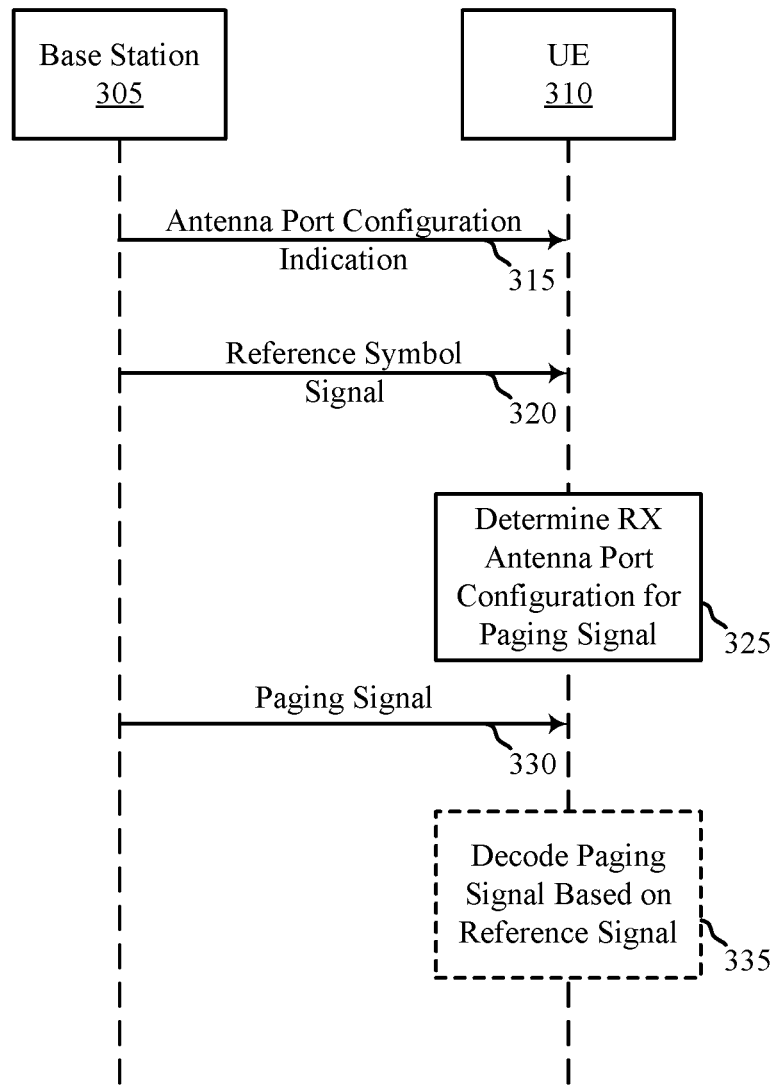
FIG. 3 illustrates an example of a process that supports quasi co-location of antenna ports used to transmit paging message and synchronization signals in accordance with aspects of the present disclosure.

FIG. 3 illustrates an example of a process 300 that supports quasi co-location of antenna ports used to transmit paging message and synchronization signals in accordance with various aspects of the present disclosure. In some examples, process 300 may implement aspects of wireless communication system 100 and/or process 200. Process 300 may include a base station 305 and a UE 310, which may be examples of the corresponding devices described herein. Broadly, process 300 illustrates an example where the antenna ports used to transmit a reference signal are QCL with antenna ports used to transmit a paging signal, e.g., a DMRS of the paging signal.

In some aspects, process 300 illustrates one example where the antenna ports (e.g., antenna port configurations) used to transmit reference signal(s) and the antenna ports used to transmit paging signal(s) are QCL. The UE 310 may find or otherwise determine its best receive (RX) beam(s) for the transmitted reference signal(s) and use this as its selected RX beam(s) to receive the paging signals. The UE 310 may use the received reference signal(s) to decode or demodulate the paging signals.

At 315, base station 305 may optionally transmit an indication of the QCL antenna ports. For example, base station 305 may transmit an indicator that it is using QCL antenna ports where the antenna ports (e.g., a first antenna port configuration) used to transmit the reference signal are QCL with the antenna ports (e.g., a second antenna port configuration) used to transmit the paging signal. Base station 305 may transmit the indication in a MIB, in a MSIB, on a PDCCH, in a PDSCH, in RRC signaling, and the like. Thus, UE 310 may know that QCL antenna ports are being used in transmissions from base station 305.

In some aspects, the indication may be carried in different carriers than are used for the reference signal and/or paging signal. For example, base station 305 may transmit the indication via an LTE/LTE-A and/or NR network (e.g., sub-6 GHz network) and then the reference signals and/or paging signals may be transmitted over a mmW wireless network (e.g., in a beamformed transmission).

In some aspects, there may be no indication of the antenna port configuration. For example, the UE 310 and/or base station 305 may be configured to know that the synchronization and/or paging signals are QCL with respect to aspects of the paging signals. Accordingly, the synchronization and/or reference signals may be QCL with respect to the paging signal without any indication of the antenna port configurations.

At 320, base station 305 may transmit (and UE 310 may receive) a reference signal. The reference signal may be transmitted using a first antenna port configuration. The reference signal may be transmitted in a beamformed transmission (e.g., a first beamformed transmission) from base station 305. In some aspects, the reference signal may include a MSIB.

In some aspects, the reference signal may contain or otherwise convey information associated with the antenna port configuration used to transmit the reference signal. For example, the reference signal may contain or otherwise convey a beam index, antenna port(s) identification information, timing information, and the like. Accordingly, a UE (such as UE 310) receiving the reference signal may be able to identify or otherwise determine the first antenna port configuration.

At 325, UE 310 may determine its receive antenna port configuration to be used for receiving the paging signal. For example, UE 310 may cycle through one or more receive antenna port configurations (e.g., using one or more antenna ports of the UE 310) to determine which receive antenna port configuration supports the strongest receive signal level for base station 305 transmissions. Accordingly, UE 310 may identify which receive antenna port configuration (e.g., RX beam) to use for listening for future transmissions from base station 305, such as future transmissions of paging signals.

In some aspects, UE 310 may listen for the reference signals transmitted from base station 305 and identify which reference signal is received with the highest received power level, with the least interference, with the highest supported throughput level, and the like. Accordingly, UE 310 may use information carried or otherwise conveyed in the reference signal to identify the antenna port configuration (e.g., the first antenna port configuration) used to transmit the reference signal. This may provide an indication of which antenna port configuration (e.g., which antenna ports will be used, transmission timing information, etc.) the base station 305 will use for paging signal transmission. That is, since UE 310 knows that base station 305 uses QCL antenna ports and which antenna port configuration was used to transmit the reference signals, the UE 310 can then determine which antenna port configuration will be used by base station 305 to transmit the subsequent paging signal.

In some aspects, since the relationship is fixed (e.g., the synchronization and/or reference signal are QCL with respect to the paging signal), the receive antenna port configuration can be determined using the following technique. First and from the perspective of base station 305, assume that base station 305 transmits 20 synchronization signal blocks (SSB), i.e., transmits synchronization signal towards 20 directions. Base station 305 may also transmit paging signal towards 20 directions. In some aspects, the DMRS of the N-th paging signal (message/schedule/indicator) may be QCL with that of the N-th SSB. Once UE 310 detects a SSB with a certain receive beam, it can use the same or a refined receive beam to receive the paging signal.

At 330, base station 305 may transmit (and UE 310 may receive) a paging signal. The paging signal may be any paging related information, such as a paging indicator (e.g., a paging DCI), a paging message, and the like. The paging signal may be transmitted in a beamformed transmission (e.g., a second beamformed transmission).

In some aspects, the antenna ports used to transmit the paging signal may be QCL with the antenna ports used to transmit the reference signal. QCL antenna ports may include two antenna ports where the properties (e.g., large-scale properties) of the channel over which a symbol on one antenna port is conveyed can be inferred from the channel over which a symbol on the other antenna port is conveyed. Examples of the properties may include, but are not limited to one or more of delay spread, Doppler spread, Doppler shift, average gain, an average delay, an angle of arrival, an angle of departure, or any combination thereof. In some aspects, base station 305 may infer the properties, e.g., over a period of time (periodic or dynamically), over a certain number of previous transmissions, etc., and determine the antenna port configurations to use for the synchronization signal and paging signal transmissions.

In some aspects, the reference signal and the paging signal may be multiplexed. For example, the reference signal and the paging signal may be TDM together, e.g., either in the same slot (transmitted side-by-side) or different slots (transmitted in separate slots in a disjoint manner).

At 335, UE 310 may optionally use the reference signal to decode the paging signal. For example, the reference signal may carry or otherwise use information usable by UE 310 to decode or demodulate the information contained in the paging signal.

Figure 4:
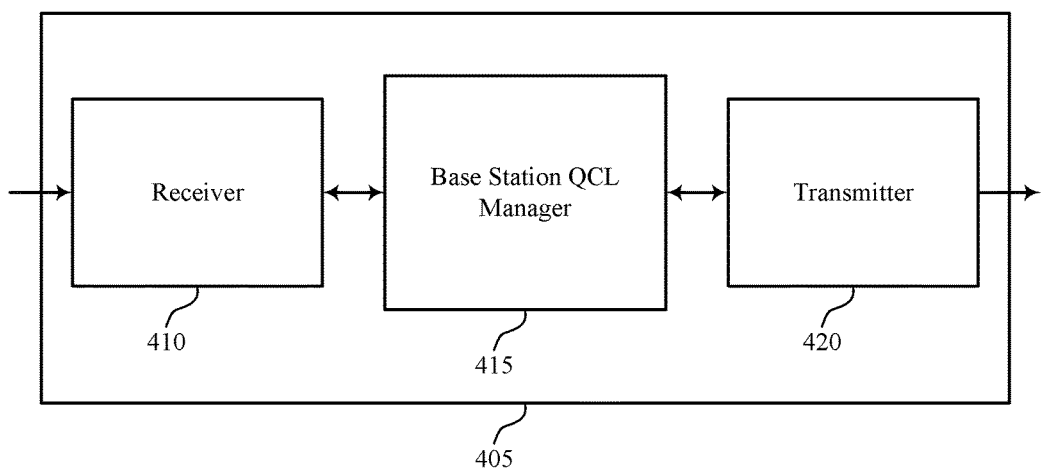
FIGS. 4 through 6 show block diagrams of a device that supports quasi co-location of antenna ports used to transmit paging message and synchronization signals in accordance with aspects of the present disclosure.

FIG. 4 shows a block diagram 400 of a wireless device 405 that supports quasi co-location of antenna ports used to transmit paging message and synchronization signals in accordance with aspects of the present disclosure. Wireless device 405 may be an example of aspects of a base station 105 as described herein. Wireless device 405 may include receiver 410, base station QCL manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to quasi co-location of antenna ports used to transmit paging message and synchronization signals, etc.). Information may be passed on to other components of the device. The receiver 410 may be an example of aspects of the transceiver 735 described with reference to FIG. 7. The receiver 410 may utilize a single antenna or a set of antennas.

Base station QCL manager 415 may be an example of aspects of the base station QCL manager 715 described with reference to FIG. 7.

Base station QCL manager 415 and/or at least some of its various sub-components may be implemented in hardware, software executed by a processor, firmware, or any combination thereof. If implemented in software executed by a processor, the functions of the base station QCL manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station QCL manager 415 and/or at least some of its various sub-components may be physically located at various positions, including being distributed such that portions of functions are implemented at different physical locations by one or more physical devices. In some examples, base station QCL manager 415 and/or at least some of its various sub-components may be a separate and distinct component in accordance with various aspects of the present disclosure. In other examples, base station QCL manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station QCL manager 415 may transmit a synchronization signal to a UE (e.g., to a particular UE and/or cell specific) using a first antenna port configuration and transmit a paging signal to the UE using a second antenna port configuration, where the first antenna port configuration used to transmit the synchronization signal includes antenna ports that are quasi co-located with respect to antenna ports of the second antenna port configuration used to transmit the paging signal. The base station QCL manager 415 may also transmit a reference signal to a UE. The base station QCL manager 415 may transmit a paging signal to the UE. In some aspects, the reference signal and a DMRS of the paging signal are QCL.

Base station QCL manager 415 may transmit sweeping signal to a UE (e.g., to a particular UE and/or cell specific) using a first antenna port configuration. Base station QCL manager 415 may transmit a paging signal to the UE using a second antenna port configuration, wherein the first antenna port configuration used to transmit the sweeping signal comprises antenna ports that are quasi co-located with respect to antenna ports of the second antenna port configuration used to transmit the paging signal.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
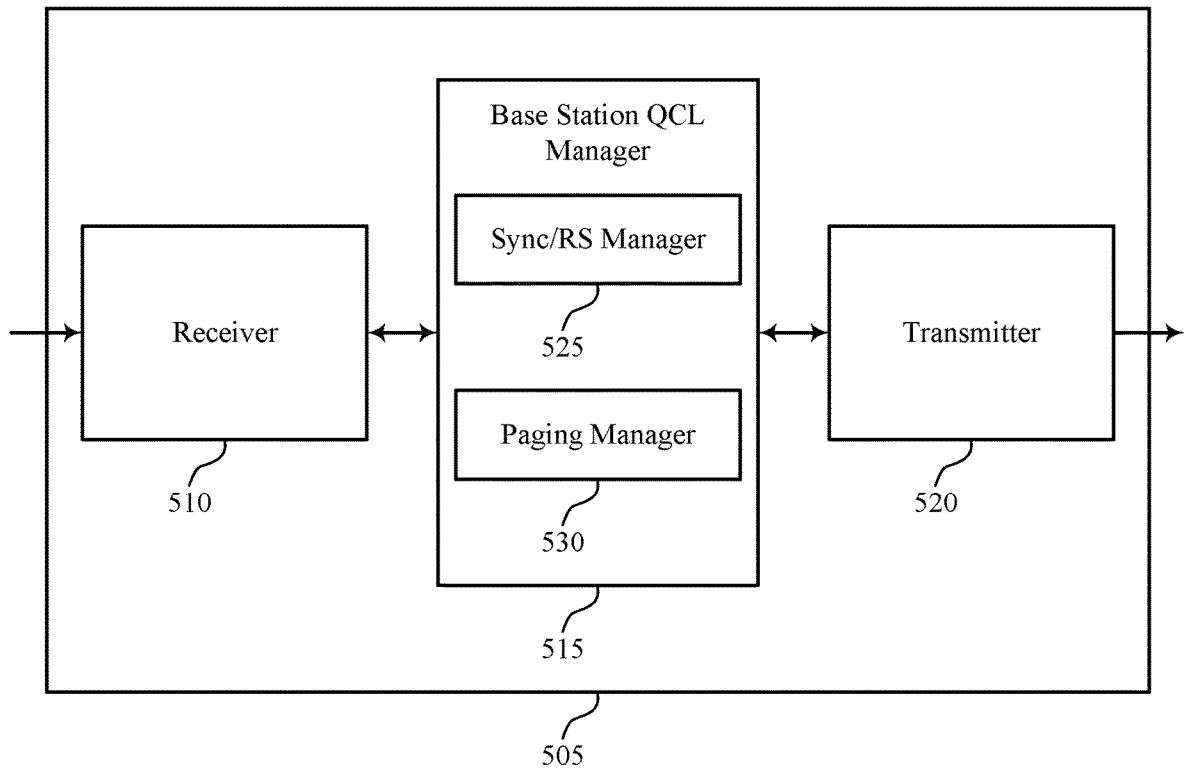

FIG. 5 shows a block diagram 500 of a wireless device 505 that supports quasi co-location of antenna ports used to transmit paging message and synchronization signals in accordance with aspects of the present disclosure. Wireless device 505 may be an example of aspects of a wireless device 405 or a base station 105 as described herein. Wireless device 505 may include receiver 510, base station QCL manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to quasi co-location of antenna ports used to transmit paging message and synchronization signals, etc.). Information may be passed on to other components of the device. The receiver 510 may be an example of aspects of the transceiver 735 described with reference to FIG. 7. The receiver 510 may utilize a single antenna or a set of antennas.

Base station QCL manager 515 may be an example of aspects of the base station QCL manager 715 described with reference to FIG. 7. Base station QCL manager 515 may also include sync/RS manager 525 and paging manager 530.

Sync/RS manager 525 may transmit a synchronization signal to a UE (e.g., to a particular UE and/or cell specific) using a first antenna port configuration and transmit a reference signal to a UE, e.g., using a first antenna port configuration. In some cases, the synchronization signal includes one or more of a PSS, a SSS, a PBCH, a TSS, a mobility reference signal, a TRS, a CSI-RS, and a BRS. Sync/RS manager 525 may transmit a sweeping signal to a UE (e.g., to a particular UE and/or cell specific) using a first antenna port configuration.

Paging manager 530 may transmit a paging signal to the UE, e.g., using a second antenna port configuration. In some aspects, the first antenna port configuration used to transmit the synchronization signal includes antenna ports that are quasi co-located with respect to antenna ports of the second antenna port configuration used to transmit the paging signal. Paging manager 530 may transmit a paging signal to the UE, e.g., using a second antenna port configuration. In some aspects, the first antenna port configuration used to transit the reference signal includes antenna ports that are quasi co-located with respect to antenna ports of the second antenna port configuration used to transmit the paging signal. In some aspects, the reference signal and a DMRS of the paging signal are QCL. In some cases, the paging signal includes at least one of a paging message, or a paging schedule, or a paging indication (such as a paging DCI). Paging manager 530 may transmit a paging signal to the UE, e.g., using a second antenna port configuration. In some aspects, the first antenna port configuration used to transmit the sweeping signal comprises antenna ports that are quasi co-located with respect to antenna ports of the second antenna port configuration used to transmit the paging signal.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
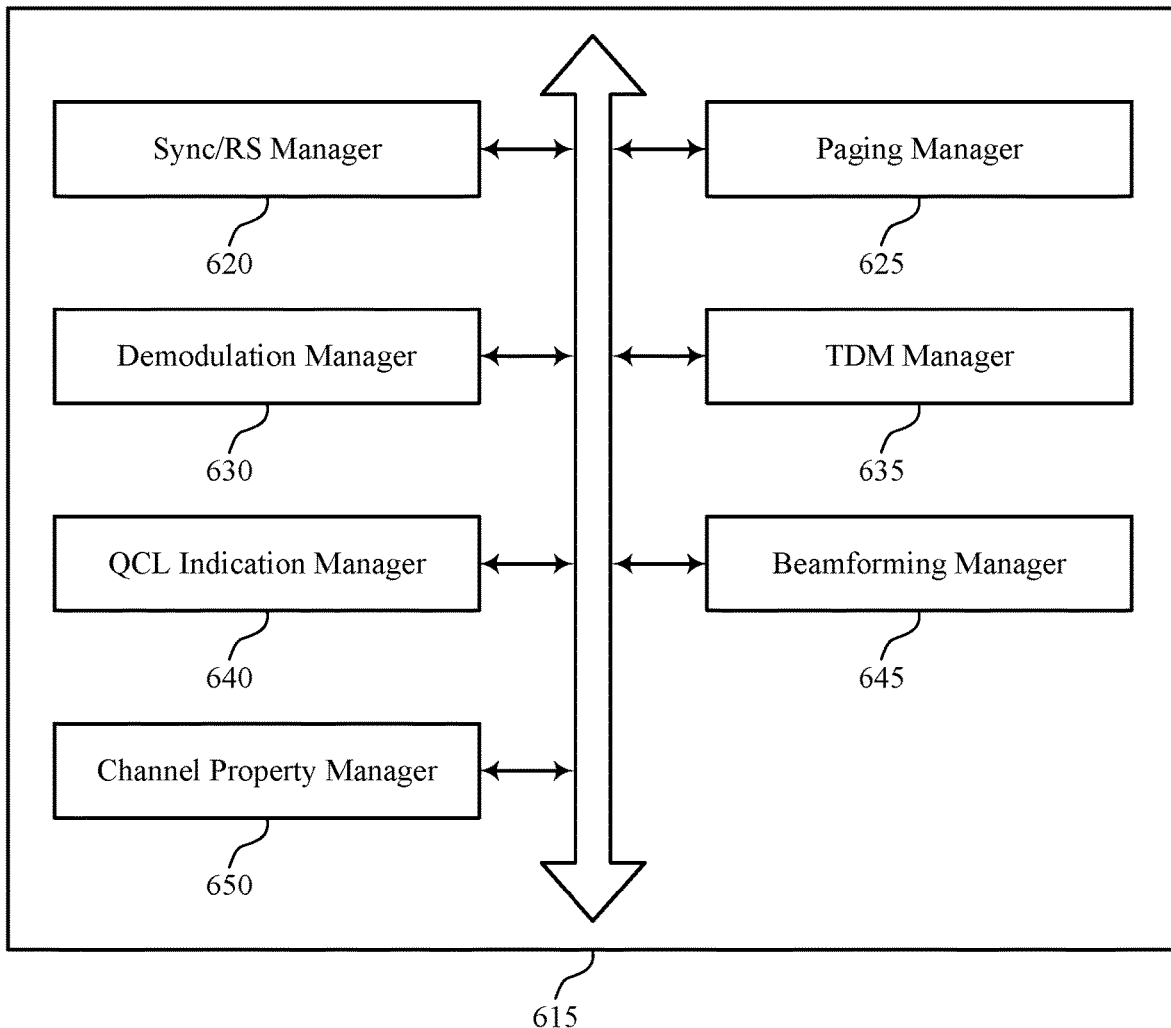

FIG. 6 shows a block diagram 600 of a base station QCL manager 615 that supports quasi co-location of antenna ports used to transmit paging message and synchronization signals in accordance with aspects of the present disclosure. The base station QCL manager 615 may be an example of aspects of a base station QCL manager 415, a base station QCL manager 515, or a base station QCL manager 715 described with reference to FIGS. 4, 5, and 7. The base station QCL manager 615 may include sync/RS manager 620, paging manager 625, demodulation manager 630, TDM manager 635, QCL indication manager 640, beamforming manager 645, and channel property manager 650. Each of these modules may communicate, directly or indirectly, with one another (e.g., via one or more buses).

Sync/RS manager 620 may transmit a synchronization signal to a UE (e.g., to a particular UE and/or cell specific) using a first antenna port configuration. Sync/RS manager 620 may transmit a reference signal to a UE, e.g., using a first antenna port configuration. Sync/RS manager 620 may transmit a sweeping signal to a UE (e.g., to a particular UE and/or cell specific) using a first antenna port configuration In some cases, the synchronization signal includes one or more of a PSS, a SSS, a PBCH, a TSS, a mobility reference signal, a TRS, a CSI-RS, and a BRS. In some cases, the sweeping signal includes a signal that is transmitted in a sweeping manner to one or more directions. In some cases, the sweeping signal includes one or more of a synchronization signal, a reference signal, or combinations thereof. In some cases, the synchronization signal includes one or more of a PSS, a SSS, a TSS, an ESS, or combinations thereof. In some cases, the reference signal includes one or more of a CSI-RS, a CRS, a BRS, a BRRS, a MRS, a DMRS, or combinations thereof. In some cases, the DMRS includes a signal that is used as the reference signal to one or more of a transmit a MIB, a SIB, or combinations thereof. In some cases, the sweeping signal comprises one or more of a MIB, a SIB, or combinations thereof Paging manager 625 may transmit a paging signal to the UE, e.g., using a second antenna port configuration. In some aspects, the first antenna port configuration used to transmit the synchronization signal includes antenna ports that are quasi co-located with respect to antenna ports of the second antenna port configuration used to transmit the paging signal. Paging manager 625 may transmit a paging signal to the UE, e.g., using a second antenna port configuration. In some aspects, the reference signal and a DMRS of the paging signal are QCL. In some aspects, the first antenna port configuration used to transit the reference signal includes antenna ports that are quasi co-located with respect to antenna ports of the second antenna port configuration used to transmit the paging signal. In some cases, the paging signal includes at least one of a paging message, a paging schedule, or a paging indication (such as a paging DCI). In some cases, the paging message may be communicated in a PDSCH and the paging schedule may be communicated in a PDCCH.

Demodulation manager 630 may transmit a reference signal using the antenna ports used to transmit the synchronization signal, where the reference signal may be used to demodulate the paging signal. In some cases, the reference signal is used to decode one or more of a MSIB and a MIB.

TDM manager 635 may TDM the synchronization signal and the paging signal. In some aspects, this may include transmitting the synchronization signal in the same slot as the paging signal. In some aspects, this may include transmitting the synchronization signal in a different slot than the paging signal. TDM manager 635 may TDM the reference signal and the paging signal. In some aspects, this may include transmitting the reference signal in the same slot as the paging signal. In some aspects, this may include transmitting the reference signal in a different slot than the paging signal.

QCL indication manager 640 may transmit an indication of the QCL antenna ports of the first antenna port configuration and the second antenna port configuration. In some cases, the indication is transmitted in one or more of a MIB, a MSIB, a PDCCH, a PDSCH, and a RRC message exchange. In some cases, the indication is transmitted using a different carrier than the synchronization signal and the paging signal. In some cases, the indication is transmitted using a different carrier than the reference signal and the paging signal.

Beamforming manager 645 may transmit the synchronization signal in a first beamformed transmission and transmit the paging signal in a second beamformed transmission. Beamforming manager 645 may transmit the reference signal in a first beamformed transmission and transmit the paging message in a second beamformed transmission.

Channel property manager 650 may infer a set of properties for a channel that the synchronization signal is transmitted over using the first antenna port configuration based on one or more properties associated with a channel that the paging signal is transmitted over using the second antenna port configuration. Channel property manager 650 may determine, based on the inference, that the antenna ports of the first antenna port configuration are quasi co-located with respect to the antenna ports of the second antenna port configuration. Channel property manager 650 may infer a set of properties for a channel that the reference signal is transmitted over using the first antenna port configuration based on one or more properties associated with a channel that the paging signal is transmitted over using the second antenna port configuration. In some cases, the set of properties include one or more of a delay spread, a Doppler spread, a Doppler shift, an average gain, an average delay, an angle of arrival, and an angle of departure. In some cases, the reference signal and the DMRS of the paging signal are QCL with respect to receive beamforming, e.g., the signals are transmitted in such a manner that the UE can receive them using the same receive beam.

Figure 7:
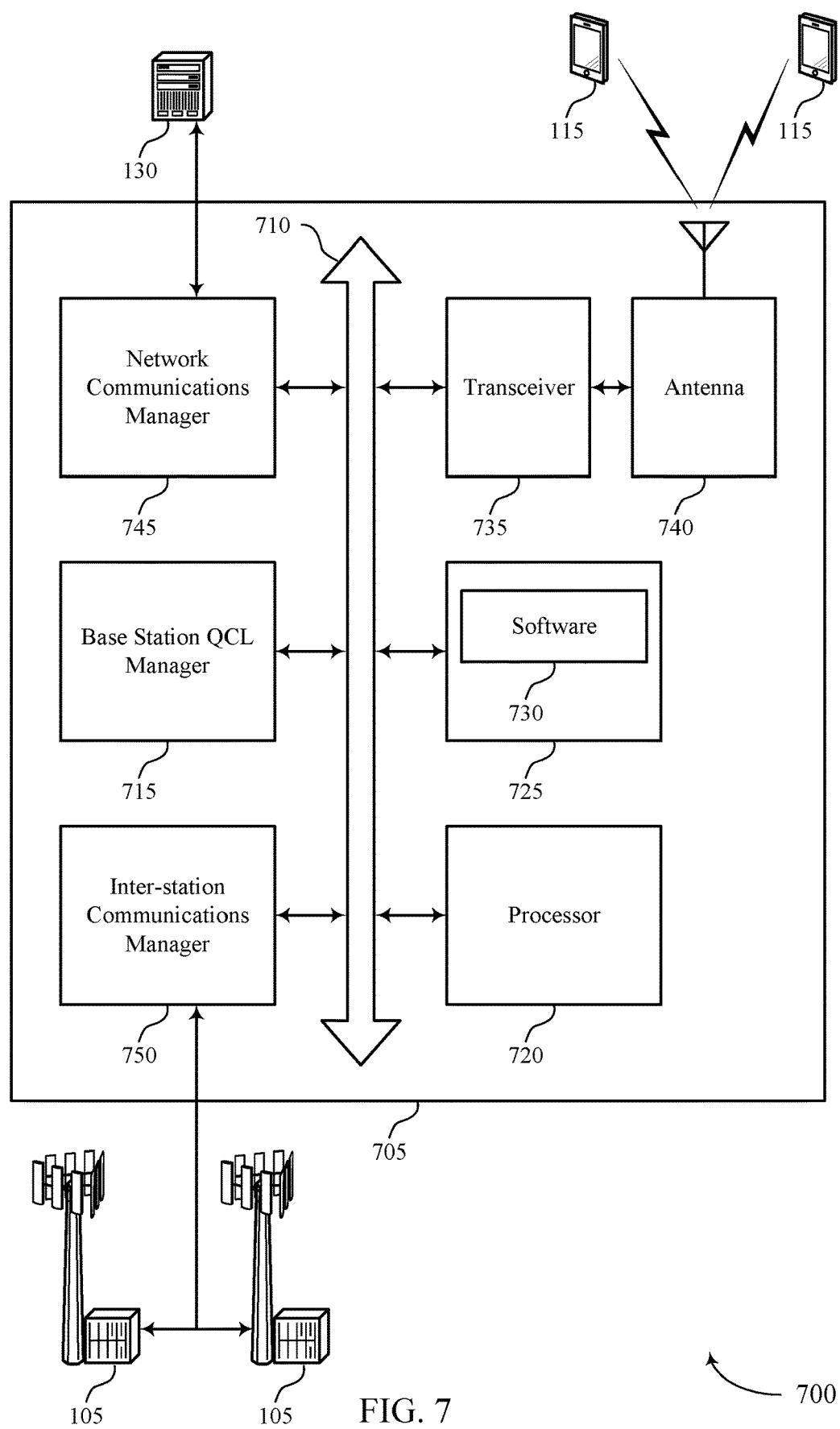
FIG. 7 illustrates a block diagram of a system including a base station that supports quasi co-location of antenna ports used to transmit paging message and synchronization signals in accordance with aspects of the present disclosure.

FIG. 7 shows a diagram of a system 700 including a device 705 that supports quasi co-location of antenna ports used to transmit paging message and synchronization signals in accordance with aspects of the present disclosure. Device 705 may be an example of or include the components of wireless device 405, wireless device 505, or a base station 105 as described herein. Device 705 may include components for bi-directional voice and data communications including components for transmitting and receiving communications, including base station QCL manager 715, processor 720, memory 725, software 730, transceiver 735, antenna 740, network communications manager 745, and inter-station communications manager 750. These components may be in electronic communication via one or more busses (e.g., bus 710). Device 705 may communicate wirelessly with one or more UEs 115.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting quasi co-location of antenna ports used to transmit paging message and synchronization signals).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support quasi co-location of antenna ports used to transmit paging message and synchronization signals. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

Network communications manager 745 may manage communications with the core network (e.g., via one or more wired backhaul links). For example, the network communications manager 745 may manage the transfer of data communications for client devices, such as one or more UEs 115.

Inter-station communications manager 750 may manage communications with other base station 105, and may include a controller or scheduler for controlling communications with UEs 115 in cooperation with other base stations 105. For example, the inter-station communications manager 750 may coordinate scheduling for transmissions to UEs 115 for various interference mitigation techniques such as beamforming or joint transmission. In some examples, inter-station communications manager 750 may provide an X2 interface within an LTE/LTE-A wireless communication network technology to provide communication between base stations 105.

Figure 8:
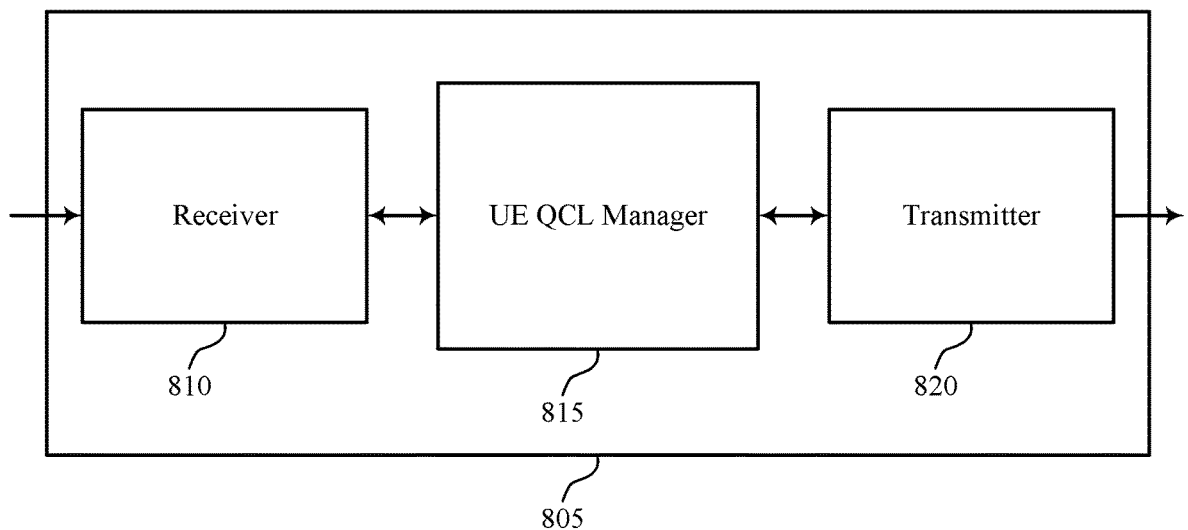
FIGS. 8 through 10 show block diagrams of a device that supports quasi co-location of antenna ports used to transmit paging message and synchronization signals in accordance with aspects of the present disclosure.

FIG. 8 shows a block diagram 800 of a wireless device 805 that supports quasi co-location of antenna ports used to transmit paging message and synchronization signals in accordance with aspects of the present disclosure. Wireless device 805 may be an example of aspects of a UE 115 as described herein. Wireless device 805 may include receiver 810, UE QCL manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to quasi co-location of antenna ports used to transmit paging message and synchronization signals, etc.). Information may be passed on to other components of the device. The receiver 810 may be an example of aspects of the transceiver 1135 described with reference to FIG. 11. The receiver 810 may utilize a single antenna or a set of antennas.

UE QCL manager 815 may be an example of aspects of the UE QCL manager 1115 described with reference to FIG. 11.

UE QCL manager 815 and/or at least some of its various sub-components may be implemented in hardware, software executed by a processor, firmware, or any combination thereof. If implemented in software executed by a processor, the functions of the UE QCL manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE QCL manager 815 and/or at least some of its various sub-components may be physically located at various positions, including being distributed such that portions of functions are implemented at different physical locations by one or more physical devices. In some examples, UE QCL manager 815 and/or at least some of its various sub-components may be a separate and distinct component in accordance with various aspects of the present disclosure. In other examples, UE QCL manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE QCL manager 815 may receive a reference signal transmitted from a base station. UE QCL manager 815 may receive a synchronization signal from the base station. In some aspects, the reference signal and a DMRS of the paging signal are QCL.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
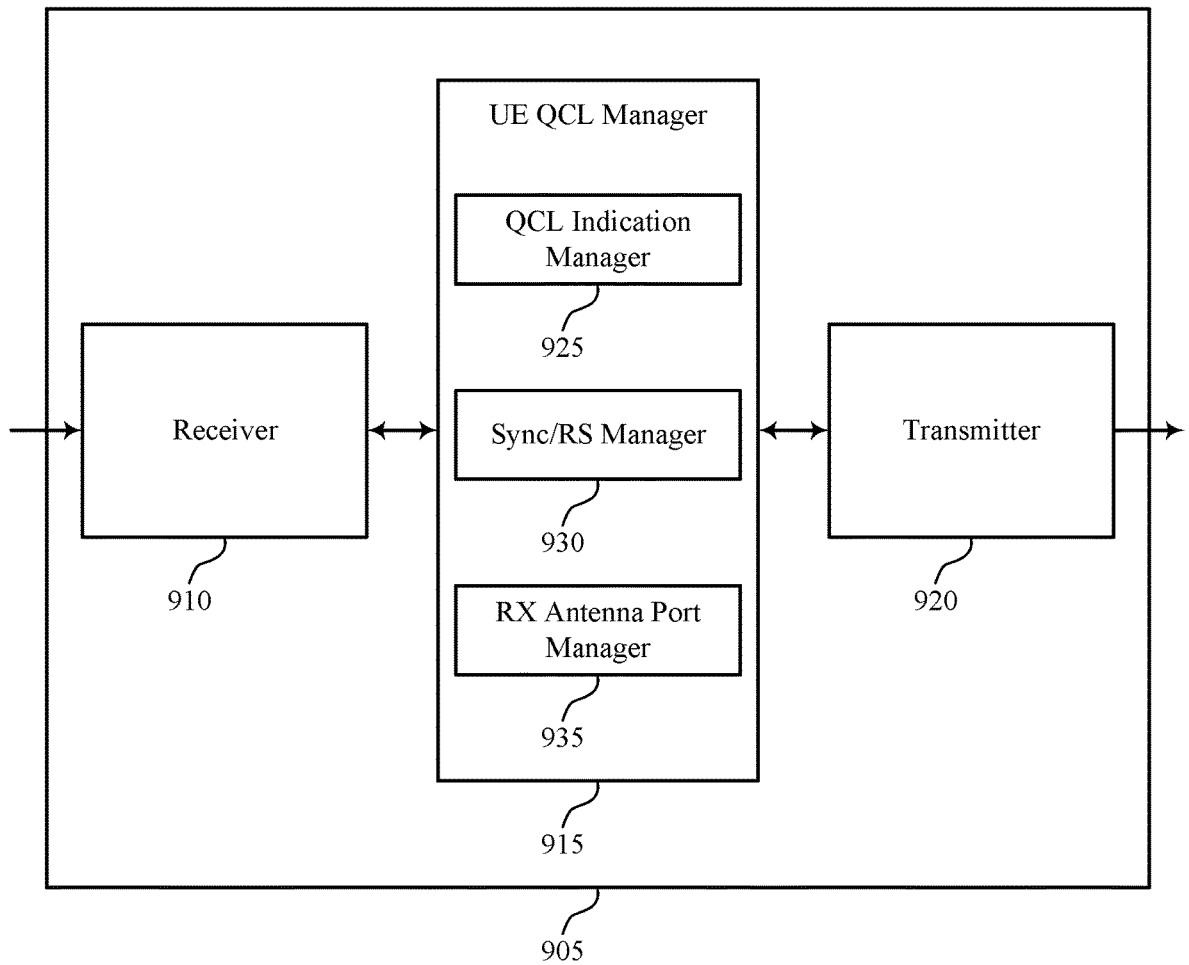

FIG. 9 shows a block diagram 900 of a wireless device 905 that supports quasi co-location of antenna ports used to transmit paging message and synchronization signals in accordance with aspects of the present disclosure. Wireless device 905 may be an example of aspects of a wireless device 805 or a UE 115 as described herein. Wireless device 905 may include receiver 910, UE QCL manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to quasi co-location of antenna ports used to transmit paging message and synchronization signals, etc.). Information may be passed on to other components of the device. The receiver 910 may be an example of aspects of the transceiver 1135 described with reference to FIG. 11. The receiver 910 may utilize a single antenna or a set of antennas.

UE QCL manager 915 may be an example of aspects of the UE QCL manager 1115 described with reference to FIG. 11. UE QCL manager 915 may also include QCL indication manager 925, sync/RS manager 930, and RX antenna port manager 935.

QCL indication manager 925 may receive an indication of a first antenna port configuration used to transmit a reference signal and a second antenna port configuration used to transmit a paging signal, where the first antenna port configuration includes antenna ports that are QCL with respect to antenna ports of the second antenna port configuration. In some cases, the indication is received in one or more of a MIB, a MSIB, a PDCCH, a PDSCH, and a RRC message exchange.

Sync/RS manager 930 may receive the reference signal transmitted from the base station. In some aspect, the reference signal using the first antenna port configuration and receive the paging signal using the receive antenna port configuration, the paging signal transmitted using the second antenna port configuration. In some cases, the reference signal includes one or more of a PSS, a SSS, a PBCH, a TSS, a mobility reference signal, a TRS, a CSI-RS, and a BRS.

RX antenna port manager 935 may determine, based on the indication, a receive antenna port configuration used to receive the paging signal.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
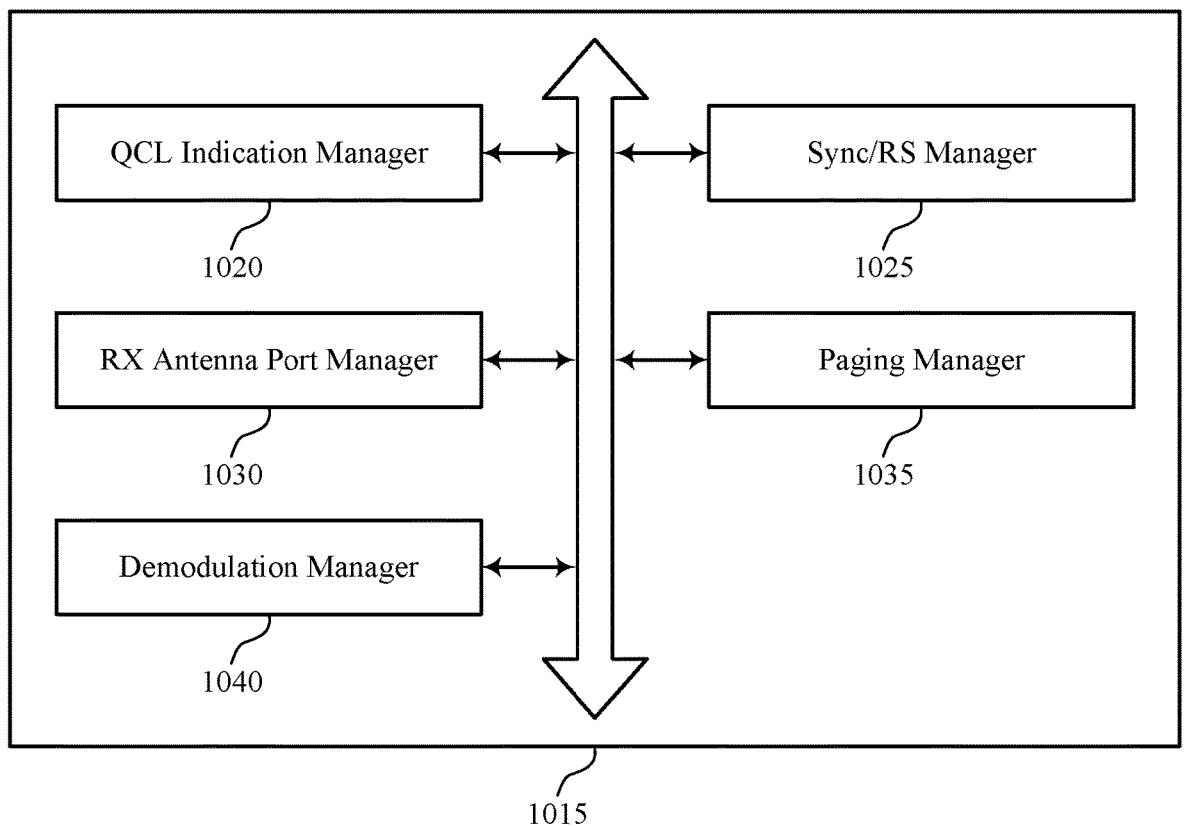

FIG. 10 shows a block diagram 1000 of a UE QCL manager 1015 that supports quasi co-location of antenna ports used to transmit paging message and synchronization signals in accordance with aspects of the present disclosure. The UE QCL manager 1015 may be an example of aspects of a UE QCL manager 1115 described with reference to FIGS. 8, 9, and 11. The UE QCL manager 1015 may include QCL indication manager 1020, sync/RS manager 1025, RX antenna port manager 1030, paging manager 1035, and demodulation manager 1040. Each of these modules may communicate, directly or indirectly, with one another (e.g., via one or more buses).

QCL indication manager 1020 may receive an indication of a first antenna port configuration used to transmit a reference signal and a second antenna port configuration used to transmit a paging signal, where the first antenna port configuration includes antenna ports that are quasi co-located with respect to antenna ports of the second antenna port configuration. In some cases, the indication is received in one or more of a MIB, a MSIB, a PDCCH, a PDSCH, and a RRC message exchange.

Sync/RS manager 1025 may receive the reference signal transmitted from a base station. Sync/RS manager 1025 may receive the paging signal from the base station. In some aspects, the reference signal and a DMRS of the paging signal are QCL. In some cases, the reference signal includes one or more of a PSS, a SSS, a PBCH, a TSS, a mobility reference signal, a TRS, a CSI-RS, and a BRS.

RX antenna port manager 1030 may determine, based on the indication, a receive antenna port configuration used to receive the paging signal.

Paging manager 1035 may manage one or more aspects of receiving a paging signal, as described herein. In some cases, the paging signal includes at least one of a paging message, a paging schedule, or a paging indication (such as a paging DCI). The paging message may be communicated in a PDSCH and the paging schedule may be communicated in a PDCCH.

Demodulation manager 1040 may receive the reference signal that was transmitted using the first antenna port configuration and demodulate the paging signal based on the reference signal.

Figure 11:
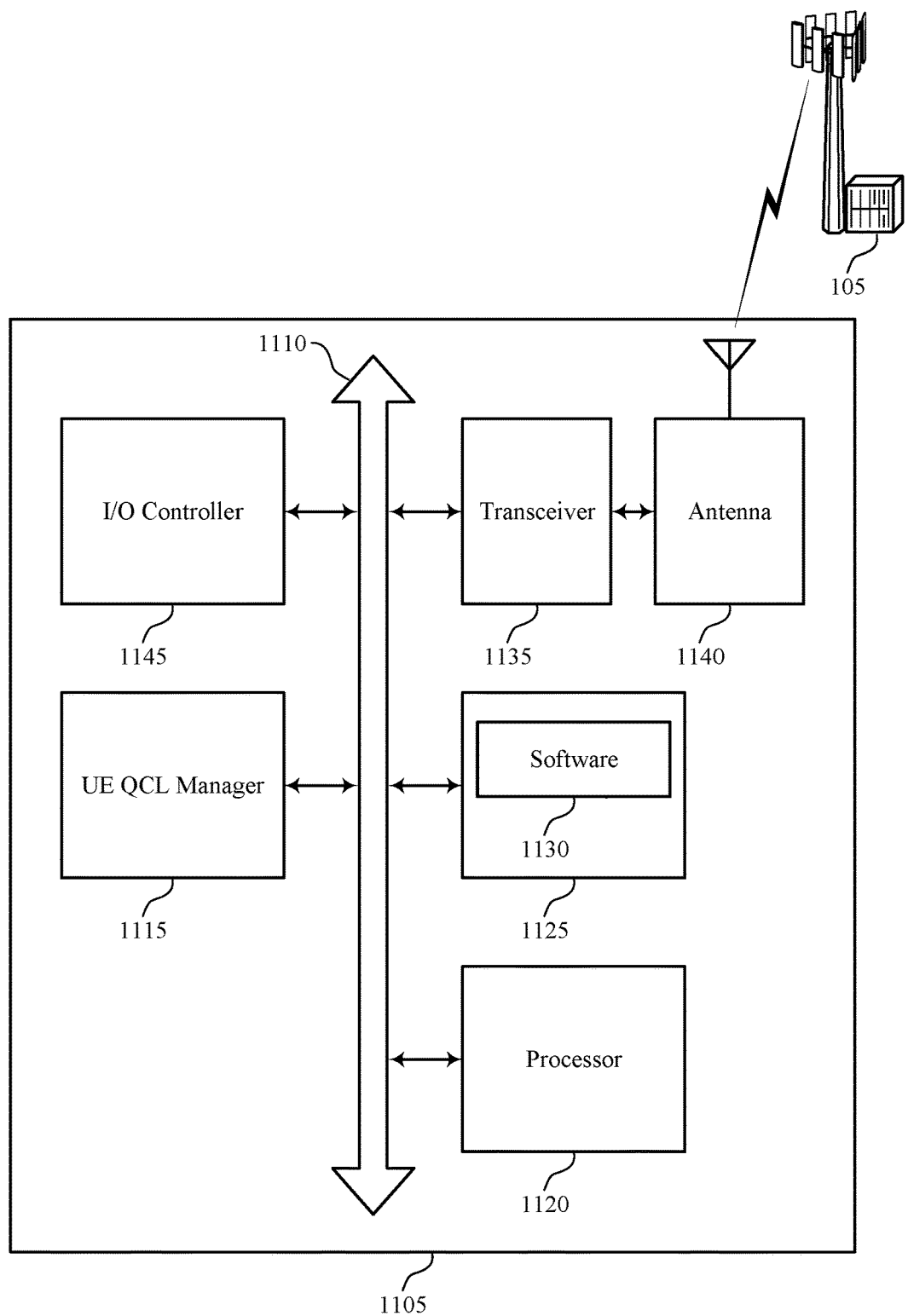
FIG. 11 illustrates a block diagram of a system including a UE that supports quasi co-location of antenna ports used to transmit paging message and synchronization signals in accordance with aspects of the present disclosure.

FIG. 11 shows a diagram of a system 1100 including a device 1105 that supports quasi co-location of antenna ports used to transmit paging message and synchronization signals in accordance with aspects of the present disclosure. Device 1105 may be an example of or include the components of UE 115 as described herein. Device 1105 may include components for bi-directional voice and data communications including components for transmitting and receiving communications, including UE QCL manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting quasi co-location of antenna ports used to transmit paging message and synchronization signals).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support quasi co-location of antenna ports used to transmit paging message and synchronization signals. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
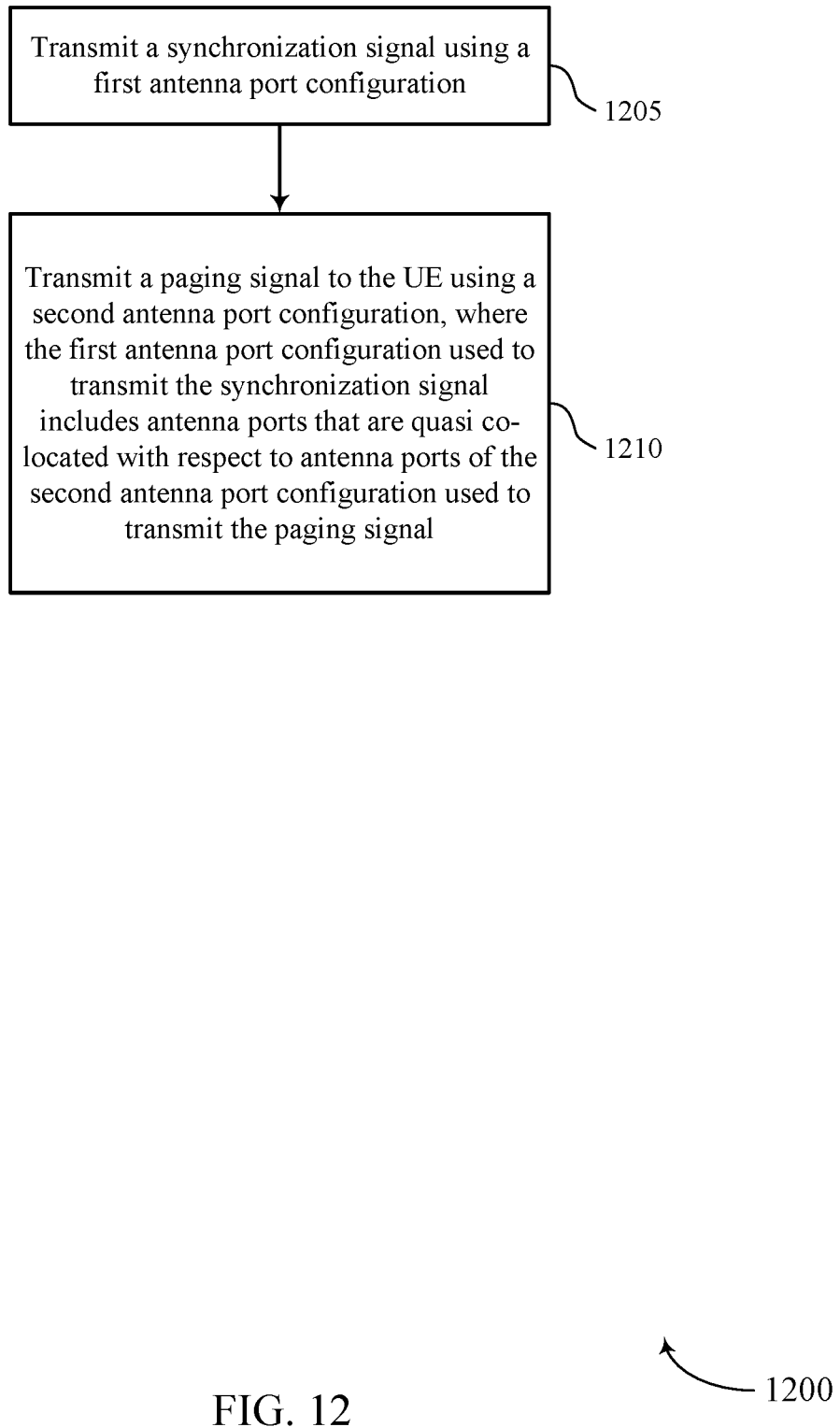
FIGS. 12 through 17 illustrate methods for quasi co-location of antenna ports used to transmit paging message and synchronization signals in accordance with aspects of the present disclosure.

FIG. 12 shows a flowchart illustrating a method 1200 for quasi co-location of antenna ports used to transmit paging message and synchronization signals in accordance with aspects of the present disclosure. The operations of method 1200 may be implemented by a base station 105 or its components as described herein. For example, the operations of method 1200 may be performed by a base station QCL manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1205 the base station 105 may transmit a synchronization signal using a first antenna port configuration. The synchronization signal may be transmitted to a UE and/or may be cell specific. The operations of block 1205 may be performed according to the methods described herein. In certain examples, aspects of the operations of block 1205 may be performed by a sync/RS manager as described with reference to FIGS. 4 through 7.

At block 1210 the base station 105 may transmit a paging signal to the UE using a second antenna port configuration, wherein the first antenna port configuration used to transmit the synchronization signal comprises antenna ports that are quasi co-located with respect to antenna ports of the second antenna port configuration used to transmit the paging signal. The operations of block 1210 may be performed according to the methods described herein. In certain examples, aspects of the operations of block 1210 may be performed by a paging manager as described with reference to FIGS. 4 through 7.

Figure 13:
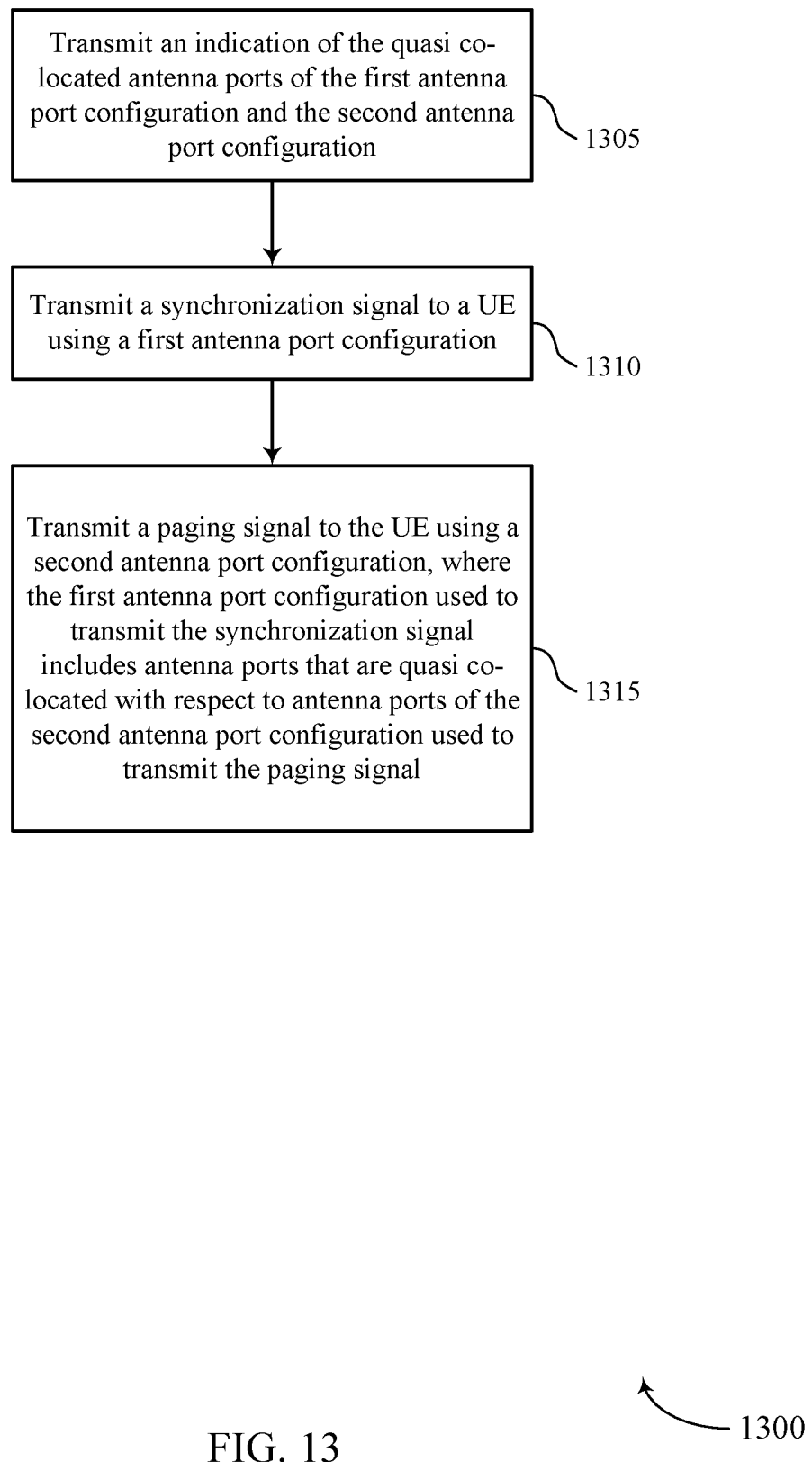

FIG. 13 shows a flowchart illustrating a method 1300 for quasi co-location of antenna ports used to transmit paging message and synchronization signals in accordance with aspects of the present disclosure. The operations of method 1300 may be implemented by a base station 105 or its components as described herein. For example, the operations of method 1300 may be performed by a base station QCL manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may transmit an indication of the quasi co-located antenna ports of the first antenna port configuration and the second antenna port configuration. The operations of block 1305 may be performed according to the methods described herein. In certain examples, aspects of the operations of block 1305 may be performed by a QCL indication manager as described with reference to FIGS. 4 through 7.

At block 1310 the base station 105 may transmit a synchronization signal to a UE (e.g., to a particular UE and/or cell specific) using a first antenna port configuration. The operations of block 1310 may be performed according to the methods described herein. In certain examples, aspects of the operations of block 1310 may be performed by a sync/RS manager as described with reference to FIGS. 4 through 7.

At block 1315 the base station 105 may transmit a paging signal to the UE using a second antenna port configuration, wherein the first antenna port configuration used to transmit the synchronization signal comprises antenna ports that are quasi co-located with respect to antenna ports of the second antenna port configuration used to transmit the paging signal. The operations of block 1315 may be performed according to the methods described herein. In certain examples, aspects of the operations of block 1315 may be performed by a paging manager as described with reference to FIGS. 4 through 7.

Figure 14:
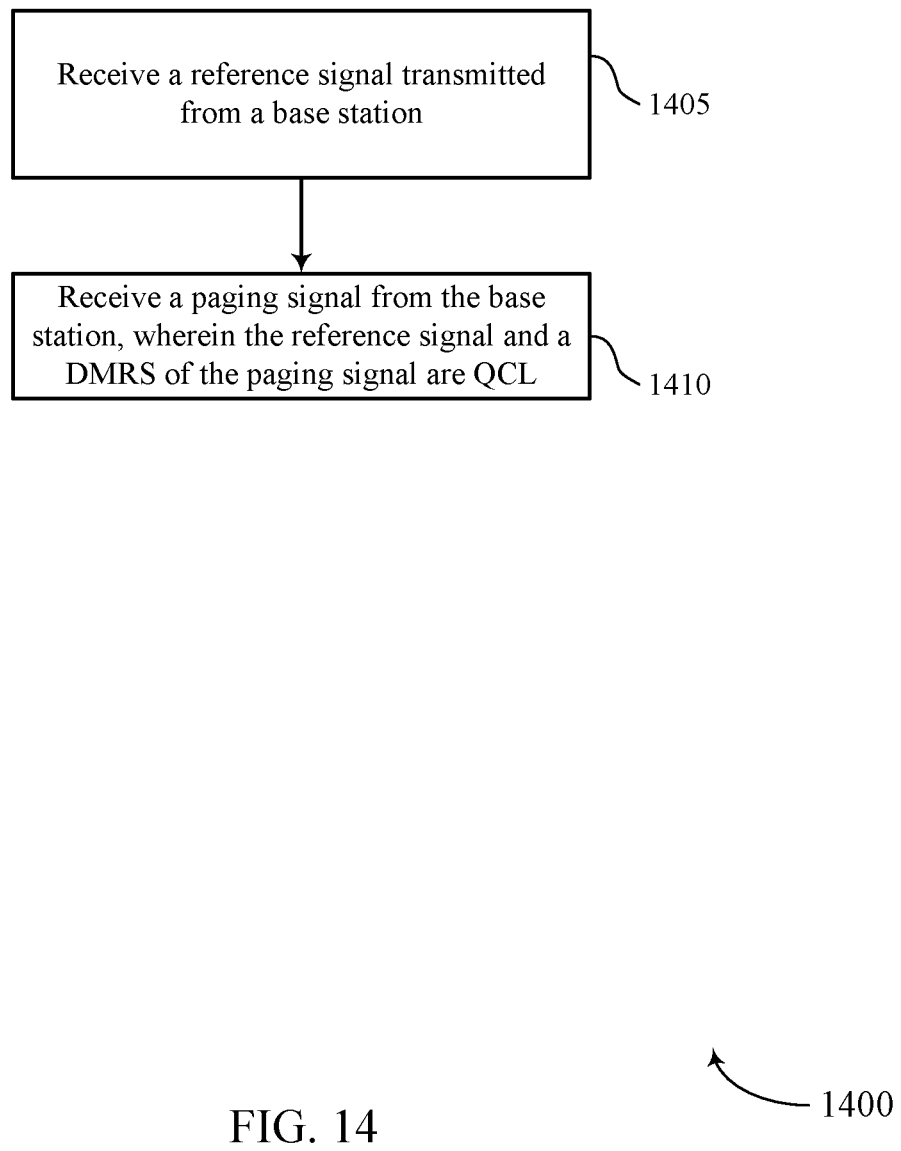

FIG. 14 shows a flowchart illustrating a method 1400 for quasi co-location of antenna ports used to transmit paging message and synchronization signals in accordance with aspects of the present disclosure. The operations of method 1400 may be implemented by a UE 115 or its components as described herein. For example, the operations of method 1400 may be performed by a UE QCL manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a reference signal transmitted from a base station. The operations of block 1405 may be performed according to the methods described herein. In certain examples, aspects of the operations of block 1405 may be performed by a QCL indication manager as described with reference to FIGS. 8 through 11.

At block 1410 the UE 115 may receive a paging signal from the base station, wherein the reference signal and a DMRS of the paging signal are QCL. The operations of block 1410 may be performed according to the methods described herein. In certain examples, aspects of the operations of block 1410 may be performed by a sync/RS manager as described with reference to FIGS. 8 through 11.

Figure 15:
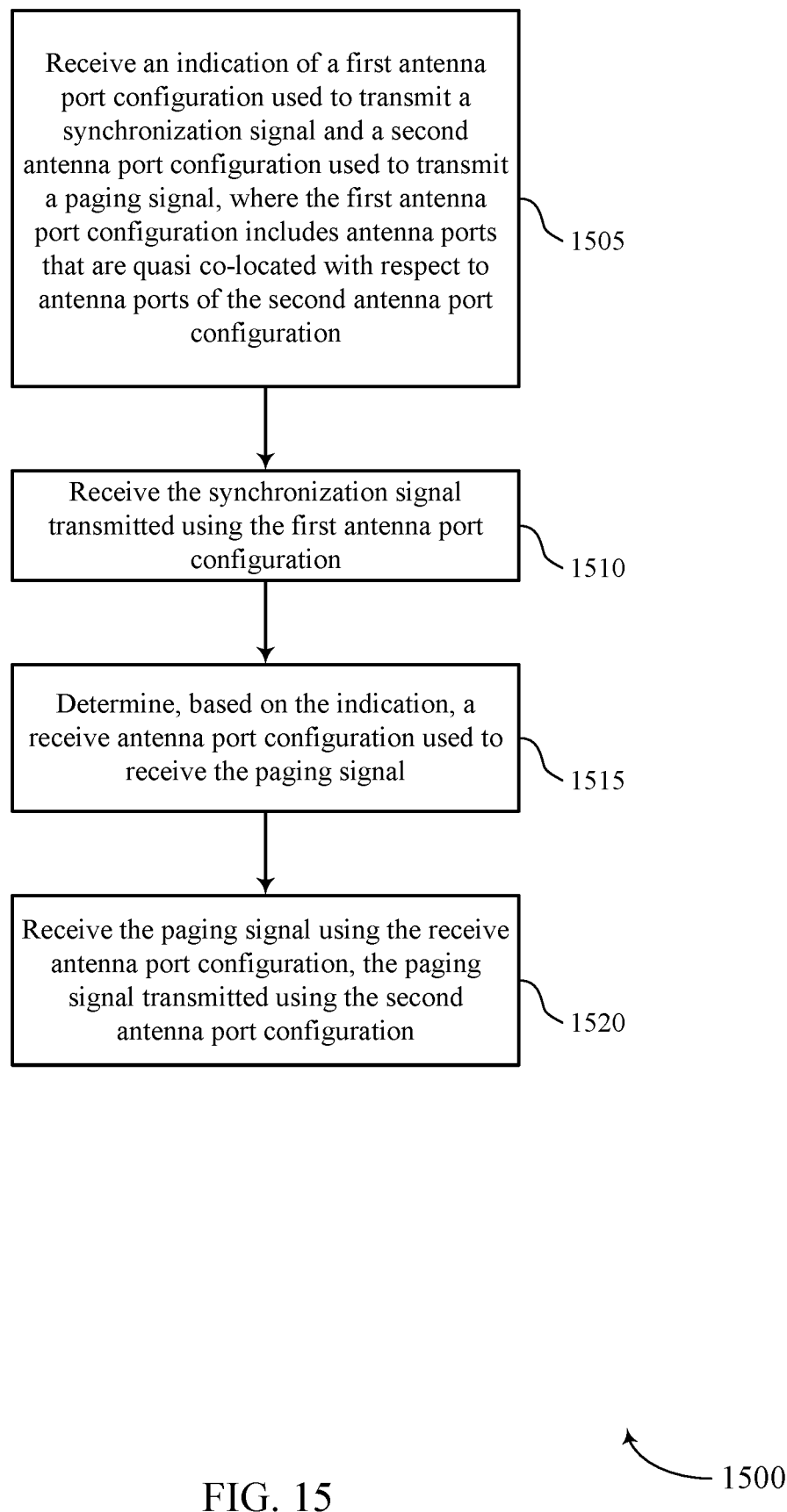

FIG. 15 shows a flowchart illustrating a method 1500 for quasi co-location of antenna ports used to transmit paging message and synchronization signals in accordance with aspects of the present disclosure. The operations of method 1500 may be implemented by a UE 115 or its components as described herein. For example, the operations of method 1500 may be performed by a UE QCL manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive an indication of a first antenna port configuration used to transmit a synchronization signal and a second antenna port configuration used to transmit a paging signal, wherein the first antenna port configuration comprises antenna ports that are quasi co-located with respect to antenna ports of the second antenna port configuration. The operations of block 1505 may be performed according to the methods described herein. In certain examples, aspects of the operations of block 1505 may be performed by a QCL indication manager as described with reference to FIGS. 8 through 11.

At block 1510 the UE 115 may receive the synchronization signal transmitted using the first antenna port configuration. The operations of block 1510 may be performed according to the methods described herein. In certain examples, aspects of the operations of block 1510 may be performed by a sync/RS manager as described with reference to FIGS. 8 through 11.

At block 1515 the UE 115 may determine, based at least in part on the indication, a receive antenna port configuration used to receive the paging signal. The operations of block 1515 may be performed according to the methods described herein. In certain examples, aspects of the operations of block 1515 may be performed by a RX antenna port manager as described with reference to FIGS. 8 through 11.

At block 1520 the UE 115 may receive the paging signal using the receive antenna port configuration, the paging signal transmitted using the second antenna port configuration. The operations of block 1520 may be performed according to the methods described herein. In certain examples, aspects of the operations of block 1520 may be performed by a sync/RS manager as described with reference to FIGS. 8 through 11.

Figure 16:
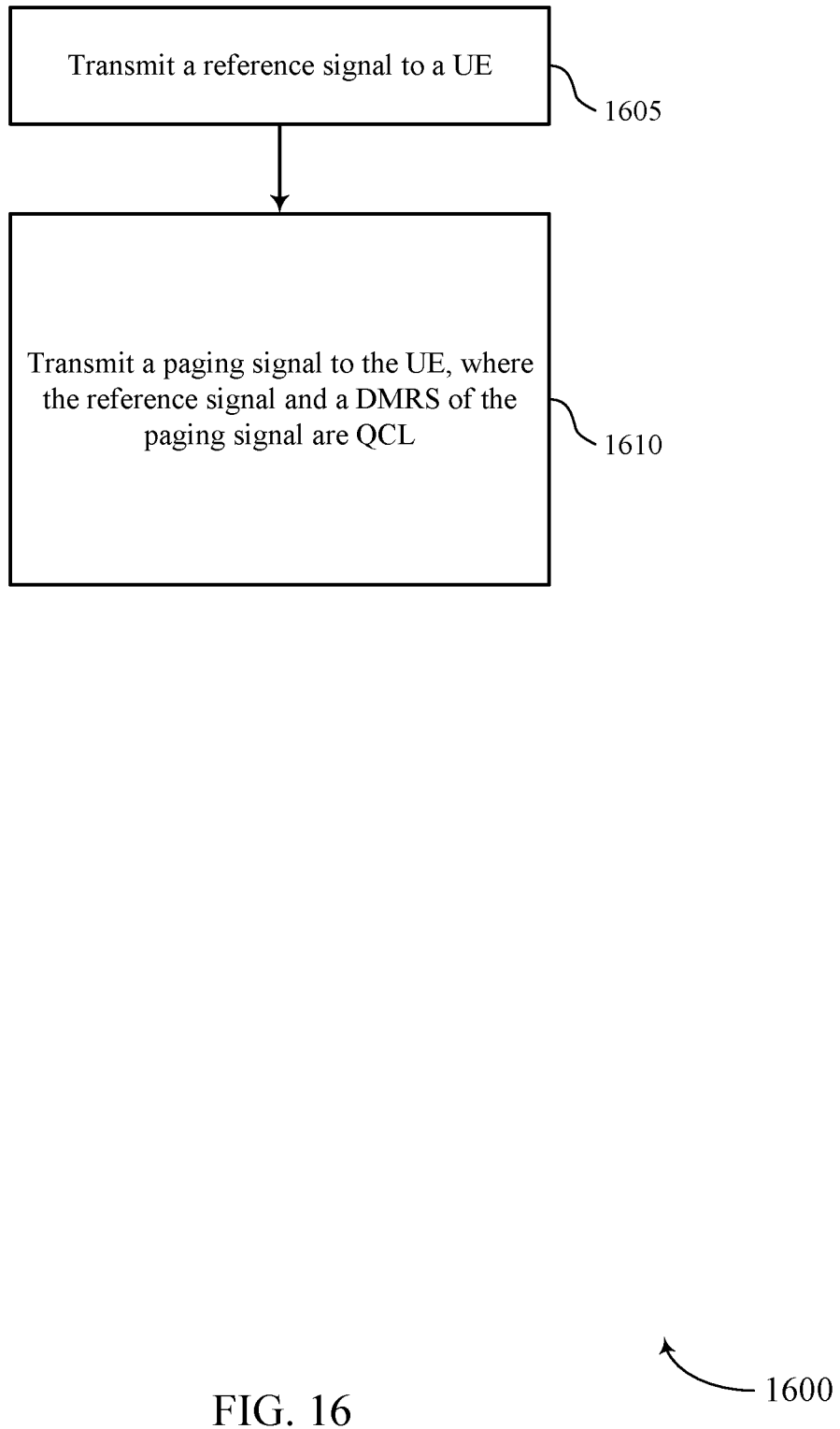

FIG. 16 shows a flowchart illustrating a method 1600 for quasi co-location of antenna ports used to transmit paging message and synchronization signals in accordance with aspects of the present disclosure. The operations of method 1600 may be implemented by a base station 105 or its components as described herein. For example, the operations of method 1600 may be performed by a base station QCL manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit a reference signal to a UE. The operations of block 1605 may be performed according to the methods described herein. In certain examples, aspects of the operations of block 1605 may be performed by a sync/RS manager as described with reference to FIGS. 4 through 7.

At block 1610 the base station 105 may transmit a paging signal to the UE, wherein the reference signal and a DMRS of the paging signal are QCL. The operations of block 1610 may be performed according to the methods described herein. In certain examples, aspects of the operations of block 1610 may be performed by a paging manager as described with reference to FIGS. 4 through 7.

Figure 17:
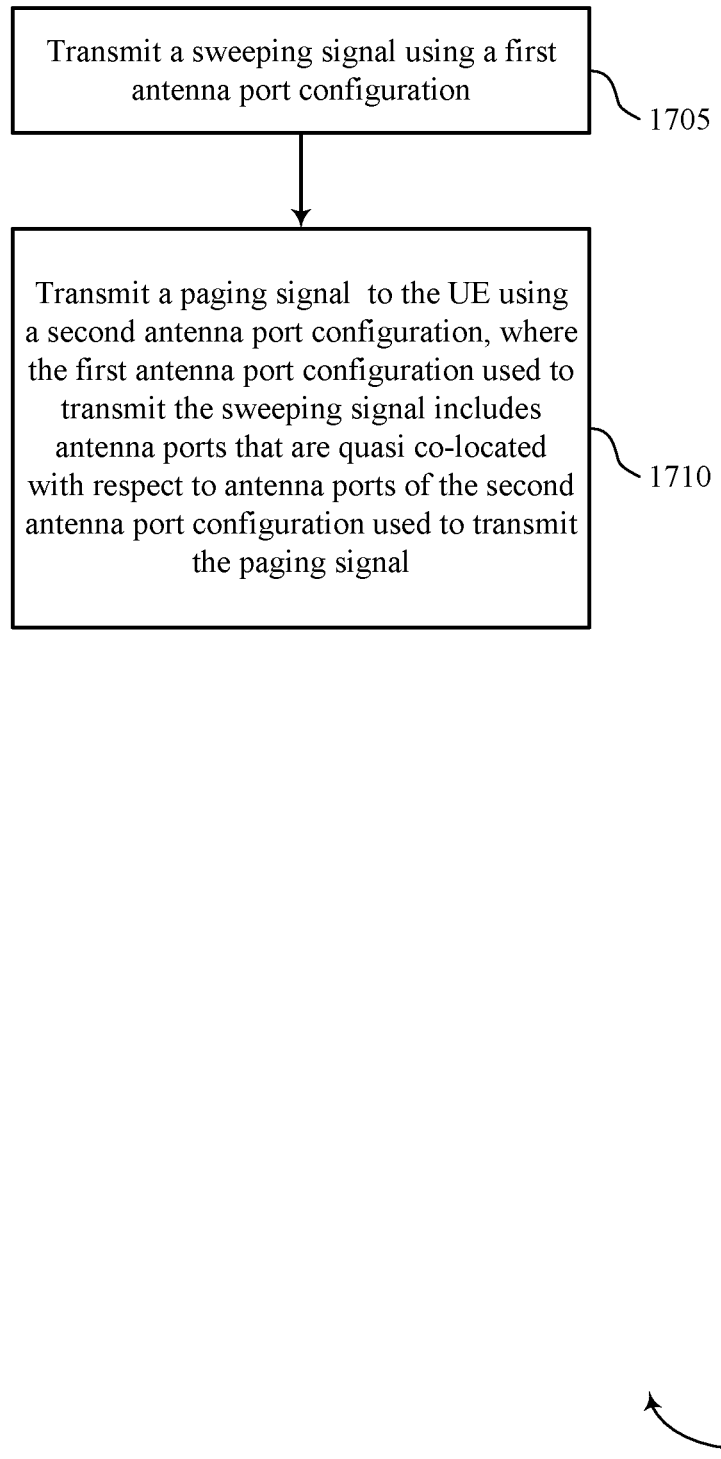

FIG. 17 shows a flowchart illustrating a method 1700 for quasi co-location of antenna ports used to transmit paging message and synchronization signals in accordance with aspects of the present disclosure. The operations of method 1700 may be implemented by a base station 105 or its components as described herein. For example, the operations of method 1700 may be performed by a QCL manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may transmit a sweeping signal using a first antenna port configuration. The sweeping signal may be transmitted to a UE and/or may be cell specific. The operations of block 1705 may be performed according to the methods described herein. In certain examples, aspects of the operations of block 805 may be performed by a sync/RS manager as described with reference to FIGS. 4 through 7.

At block 1710 the base station 105 may transmit a paging signal to the UE using a second antenna port configuration, wherein the first antenna port configuration used to transmit the sweeping signal comprises antenna ports that are quasi co-located with respect to antenna ports of the second antenna port configuration used to transmit the paging signal. The operations of block 1710 may be performed according to the methods described herein. In certain examples, aspects of the operations of block 1710 may be performed by a paging manager as described with reference to FIGS. 4 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
transmitting a synchronization signal block (SSB) to a user equipment (UE) using a first antenna port configuration; and
transmitting a paging signal to the UE using a second antenna port configuration, wherein the SSB and a demodulation reference signal (DMRS) of the paging signal are quasi co-located with respect to receive beamforming at the UE, and wherein the first antenna port configuration comprises antenna ports that are quasi co-located with respect to antenna ports of the second antenna port configuration.

2. The method of claim 1, wherein:
the paging signal comprises at least one of a paging message, a paging schedule, or a paging indication.

3. The method of claim 2, wherein:
the paging indication comprises a paging downlink control indicator (DCI).

4. The method of claim 2, wherein:
the paging message is transmitted in a physical downlink shared channel (PDSCH), and
the paging schedule is transmitted in a physical downlink control channel (PDCCH).

5. The method of claim 1, further comprising:
time-division multiplexing (TDM) the SSB and the paging signal.

6. The method of claim 5, wherein:
TDM the SSB and the paging signal comprises: transmitting the SSB in the same slot as the paging signal.

7. The method of claim 5, wherein:
TDM the SSB and the paging signal comprises: transmitting the SSB in a different slot than the paging signal.

8. The method of claim 1, further comprising:
transmitting an indication of the quasi co-located antenna ports of the first antenna port configuration and the second antenna port configuration.

9. The method of claim 8, wherein:
the indication is transmitted in one or more of a master information block (MIB), a minimum system information block (MSIB), a physical downlink control channel (PDCCH), a physical downlink shared channel (PDSCH), and a radio resource control (RRC) message exchange.

10. The method of claim 8, wherein:
the indication is transmitted using a different carrier than the SSB and the paging signal.

11. The method of claim 1, wherein:
the SSB comprises one or more of a primary synchronization signal (PSS), a secondary synchronization signal (SSS), a physical broadcast channel (PBCH), a tertiary synchronization signal (TSS), a mobility reference signal, a beam reference signal (BRS), a tracking reference signal (TRS), a channel state information reference signal (CSI-RS), or a combination thereof.

12. The method of claim 1, further comprising:
transmitting the SSB in a first beamformed transmission; and
transmitting the paging signal in a second beamformed transmission.

13. The method of claim 1, further comprising:
inferring a set of properties for a channel that the SSB is transmitted over using the first antenna port configuration based at least in part on one or more properties associated with a channel that the paging signal is transmitted over using the second antenna port configuration; and
determining, based at least in part on the inference, that the antenna ports of the first antenna port configuration are quasi co-located with respect to the antenna ports of the second antenna port configuration.

14. The method of claim 13, wherein:
the set of properties comprise one or more of a delay spread, a Doppler spread, a Doppler shift, an average gain, an average delay, an angle of arrival, and an angle of departure.

15. A method for wireless communication at a user equipment (UE), comprising:
receiving an indication of a first antenna port configuration used to transmit a synchronization signal block (SSB) and a second antenna port configuration used to transmit a paging signal, wherein the first antenna port configuration comprises antenna ports that are quasi co-located with respect to antenna ports of the second antenna port configuration;
determining, based at least in part on the indication, a receive antenna port configuration used to receive the paging signal;
receiving the SSB from a base station; and
receiving a paging signal from the base station, wherein the SSB and a demodulation reference signal (DMRS) of the paging signal are quasi co-located with respect to receive beamforming at the UE.

16. The method of claim 15, further comprising:
receiving the paging signal using a first receive antenna port configuration, the paging signal received using a second receive antenna port configuration.

17. The method of claim 15, wherein:
the paging signal comprises at least one of a paging message, a paging schedule, or a paging indication.

18. The method of claim 17, wherein:
the paging indication comprises a paging downlink control indicator (DCI).

19. The method of claim 17, wherein:
the paging message is received in a physical downlink shared channel (PDSCH), and
the paging schedule is received in a physical downlink control channel (PDCCH).

20. The method of claim 15, wherein:
the indication is received in one or more of a master information block (MIB), a minimum system information block (MSIB), a physical downlink control channel (PDCCH), a physical downlink shared channel (PDSCH), and a radio resource control (RRC) message exchange.

21. The method of claim 15, wherein:
the SSB comprises one or more of a primary synchronization signal (PSS), a secondary synchronization signal (SSS), a physical broadcast channel (PBCH), a tertiary synchronization signal (TSS), a mobility reference signal, a beam reference signal (BRS), a tracking reference signal (TRS), a channel state information reference signal (CSI-RS), or a combination thereof.

22. An apparatus for wireless communication, comprising:
a processor;
memory in electronic communication with the processor; and
instructions stored in the memory and operable, when executed by the processor, to cause the apparatus to:
transmit a synchronization signal block (SSB) to a user equipment (UE) using a first antenna port configuration; and
transmit a paging signal to the UE using a second antenna port configuration, wherein the SSB and a demodulation reference signal (DMRS) of the paging signal are quasi co-located with respect to receive beamforming at the UE, and wherein the first antenna port configuration comprises antenna ports that are quasi co-located with respect to antenna ports of the second antenna port configuration.

23. The apparatus of claim 22, wherein:
the paging signal comprises at least one of a paging message, a paging schedule, or a paging indication.

24. The apparatus of claim 23, wherein the paging indication comprises a downlink control indicator (DCI).

25. The apparatus of claim 22, wherein the instructions are further executable by the processor to:
time-division multiplexing (TDM) the SSB and the paging signal.

26. An apparatus for wireless communication, comprising:
a processor;
memory in electronic communication with the processor; and
instructions stored in the memory and operable, when executed by the processor, to cause the apparatus to:
receive an indication of a first antenna port configuration used to transmit a synchronization signal block (SSB) and a second antenna port configuration used to transmit a paging signal, wherein the first antenna port configuration comprises antenna ports that are quasi co-located with respect to antenna ports of the second antenna port configuration;
determine, based at least in part on the indication, a receive antenna port configuration used to receive the paging signal;
receive the SSB from a base station; and
receive a paging signal from the base station, wherein the SSB and a demodulation reference signal (DMRS) of the paging signal are quasi co-located with respect to receive beamforming at a user equipment associated with the apparatus.

27. A method for wireless communication, comprising:
time-division multiplexing a synchronization signal block (SSB) and a paging signal;
transmitting the SSB to a user equipment (UE) in a different slot than the paging signal; and
transmitting a paging signal to the UE, wherein the SSB and a demodulation reference signal (DMRS) of the paging signal are quasi co-located with respect to receive beamforming at the UE.

28. An apparatus for wireless communication, comprising:
a processor;
memory in electronic communication with the processor; and
instructions stored in the memory and operable, when executed by the processor, to cause the apparatus to:
time-division multiplex a synchronization signal block (SSB) and a paging signal;
transmit the SSB to a user equipment (UE) in a different slot than the paging signal; and
transmit a paging signal to the UE, wherein the SSB and a demodulation reference signal (DMRS) of the paging signal are quasi co-located with respect to receive beamforming at the UE.

29. A method for wireless communication, comprising:
receiving a synchronization signal block (SSB) from a base station; and
receiving a paging signal from the base station, wherein the SSB is received in a different slot than the paging signal, and the SSB and a demodulation reference signal (DMRS) of the paging signal are quasi co-located with respect to receive beamforming at a user equipment.

30. An apparatus for wireless communication, comprising:
   a processor;
   memory in electronic communication with the processor; and
   instructions stored in the memory and operable, when executed by the processor, to cause the apparatus to:
      receive a synchronization signal block (SSB) from a base station; and
      receive a paging signal from the base station, wherein the SSB is received in a different slot than the paging signal, and the SSB and a demodulation reference signal (DMRS) of the paging signal are quasi co-located with respect to receive beamforming at a user equipment.

\* \* \* \* \*